US 7,782,283 B2

(12) United States Patent
Hong et al.

(10) Patent No.: US 7,782,283 B2
(45) Date of Patent: Aug. 24, 2010

(54) APPARATUS AND METHOD FOR DRIVING LIQUID CRYSTAL DISPLAY DEVICE

(75) Inventors: Hee Jung Hong, Seoul (KR); Kyung Joon Kwon, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 923 days.

(21) Appl. No.: 11/633,994

(22) Filed: Dec. 5, 2006

(65) Prior Publication Data

US 2007/0182682 A1     Aug. 9, 2007

(30) Foreign Application Priority Data

Feb. 9, 2006     (KR) ...................... 10-2006-0012638

(51) Int. Cl.
*G09G 3/36* (2006.01)
*G09G 5/00* (2006.01)
*G09G 5/10* (2006.01)
*G06F 3/038* (2006.01)

(52) U.S. Cl. .......................... 345/88; 345/87; 345/102; 345/204; 345/690

(58) Field of Classification Search .................. 345/55, 345/82, 84, 87, 88, 91–94, 99, 102
See application file for complete search history.

(56) References Cited

U.S. PATENT DOCUMENTS

| 7,355,611 | B2 * | 4/2008 | Bianchi et al. | .............. 345/690 |
| 2002/0149576 | A1 * | 10/2002 | Tanaka et al. | ............... 345/204 |
| 2005/0140614 | A1 * | 6/2005 | Baek | ........................... 345/87 |
| 2006/0007112 | A1 * | 1/2006 | Park | ........................... 345/102 |
| 2006/0284805 | A1 * | 12/2006 | Baek | ........................... 345/88 |
| 2007/0008275 | A1 * | 1/2007 | Sugitani et al. | ............. 345/102 |

* cited by examiner

*Primary Examiner*—Sumati Lefkowitz
*Assistant Examiner*—Charles Hicks
(74) *Attorney, Agent, or Firm*—Brinks Hofer Gilson & Lione

(57) ABSTRACT

An apparatus and method for driving an LCD device is provided. The apparatus includes an LCD panel that is comprised of red, green, blue and white sub-pixels. A data converter converts input data of three colors into input data of four colors. A data driver converts the input data of four colors into a video signal, and supplies the video signal to each sub-pixel. A gate driver supplies a scan pulse to each sub-pixel. A timing controller arranges the input data of four colors supplied from the data converter and then supplies the arranged data to the data driver. A backlight unit is comprised of LEDs of at least five colors to emit the light to the LCD panel. A backlight controller controls the backlight unit in accordance with the input data of three colors and the sub-frame control signal.

24 Claims, 16 Drawing Sheets

FIG. 1
Related Art

| R | G | B | R | G | B | R | G | B | R | G | B | R | G | B | R | G | B |
|---|---|---|---|---|---|---|---|---|---|---|---|---|---|---|---|---|---|
| R | G | B | R | G | B | R | G | B | R | G | B | R | G | B | R | G | B |
| R | G | B | R | G | B | R | G | B | R | G | B | R | G | B | R | G | B |
| R | G | B | R | G | B | R | G | B | R | G | B | R | G | B | R | G | B |

FIG. 2
Related Art

| R | G | B | W | R | G | B | W | R | G | B | W | R | G | B | W |
|---|---|---|---|---|---|---|---|---|---|---|---|---|---|---|---|
| R | G | B | W | R | G | B | W | R | G | B | W | R | G | B | W |
| R | G | B | W | R | G | B | W | R | G | B | W | R | G | B | W |
| R | G | B | W | R | G | B | W | R | G | B | W | R | G | B | W |

FIG. 3
Related Art

| R | G | R | G | R | G | R | G | R | G | R | G | R | G | R | G |
|---|---|---|---|---|---|---|---|---|---|---|---|---|---|---|---|
| B | W | B | W | B | W | B | W | B | W | B | W | B | W | B | W |
| R | G | R | G | R | G | R | G | R | G | R | G | R | G | R | G |
| B | W | B | W | B | W | B | W | B | W | B | W | B | W | B | W |
| R | G | R | G | R | G | R | G | R | G | R | G | R | G | R | G |
| B | W | B | W | B | W | B | W | B | W | B | W | B | W | B | W |
| R | G | R | G | R | G | R | G | R | G | R | G | R | G | R | G |
| B | W | B | W | B | W | B | W | B | W | B | W | B | W | B | W |
| R | G | R | G | R | G | R | G | R | G | R | G | R | G | R | G |
| B | W | B | W | B | W | B | W | B | W | B | W | B | W | B | W |

⊘ Red  ⊛ Green  ⊛ Blue  ⊙ Cyan  ○ Yellow  ⊛ Magenta

APPARATUS AND METHOD FOR DRIVING LIQUID CRYSTAL DISPLAY DEVICE

This application claims the benefit of the Korean Patent Application No. P2006-0012638, filed on Feb. 9, 2006, which is hereby incorporated by reference as if fully set forth herein.

BACKGROUND

The present embodiments relate to an apparatus and method for driving an LCD device.

RELATED ART

Generally, an LCD device displays an image on an LCD panel by controlling transmittance of light provided from a backlight unit. The LCD panel is provided with a plurality of liquid crystal cells arranged in a matrix configuration, and a plurality of control switches to switch a video signal supplied to the liquid crystal cells.

The LCD device includes a liquid crystal layer in which an electric field is formed in accordance with a data signal, to thereby display the desired image by controlling the transmittance of light passing through the liquid crystal layer. If the electric field is applied along one direction to the liquid crystal layer for a long time, it may cause deterioration. To prevent deterioration, the polarity of a data signal is inverted at each frame, each line, or each dot.

As shown in FIG. 1, a related art LCD device includes an LCD panel which is comprised of pixels arranged in a matrix configuration. Each pixel is provided with three-color dots of red(R), green(G) and blue(B) colors. The LCD device can obtain one color image by mixing red, green and blue light generated from the respective dots. The related art LCD device requires a backlight unit to emit the light to the LCD panel.

The backlight unit generally has a small size, thin profile, and light weight. Accordingly, a light emitting diode (LED) has been substituted for a fluorescent lamp. The LED is advantageous because of low power consumption, light weight, and good brightness properties.

The backlight unit using the LED generates the white light by mixing the red(R), green(G) and blue(B) light respectively generated from red, green(G) and blue(B) LEDs, and then applies the generated white light to the LCD panel.

The related art LCD device includes a unit pixel provided with dots of red(R), green(G) and blue(B) colors, and may have a problem of low light-efficiency. In detail, color filters arranged in the respective sub-pixels of red(R), green(G) and blue(B) colors transmit only a third part (⅓) of the applied light, and thus the light-efficiency is lowered. Accordingly, a RGBW-type LCD device is newly designed. The RGBW-type LCD device includes one unit pixel provided with dots of four colors of red(R), green(G), blue(B) and white(W) colors.

As shown in FIG. 2, the RGBW-type LCD device may have dots of four colors arranged in a stripe shape. Alternatively, as shown in FIG. 3, the RGBW-type LCD device may have dots of four colors arranged in a quad shape.

In the RGBW-type LCD device, red, green and blue color filters are respectively formed in the red, green and blue dots. The white dot has no color filter.

The RGBW-type LCD device applies the white light generated by a backlight unit using a fluorescent lamp to the LCD panel. The RGBW-type LCD device improves the brightness by mixing the white light passing through the white dot with the white light generated by mixing the red, green and blue light.

The RGBW-type LCD device has not been applied to the backlight unit using the LED.

The RGBW-type LCD device displays the color image by using the red, green, blue and white light so that it is difficult to highly improve the color realization ratio.

SUMMARY

Accordingly, the present embodiments are directed to an apparatus and method for driving an LCD device, which may obviate one or more problems due to limitations and disadvantages of the related art. For example, one embodiment improves a color realization ratio of an LCD panel using an LED backlight unit comprised of LEDs of at least five colors.

In one embodiment, an LCD device comprises an LCD panel that includes red, green, blue and white sub-pixels. A data converter converts input data of three colors into input data of four colors. A data driver converts the input data of four colors into a video signal, and supplies the video signal to each sub-pixel. A gate driver supplies a scan pulse to each sub-pixel. A timing controller arranges the input data of four colors supplied from the data converter by each frame in four-color data for at least three sub-frames and supplies the arranged data to the data driver, and generates a sub-frame control signal corresponding to each sub-frame. A backlight unit includes LEDs of at least five colors to emit the light to the LCD panel. A backlight controller controls the backlight unit in accordance with the input data of three colors and the sub-frame control signal.

In another embodiment, an apparatus for driving an LCD device includes an LCD panel that includes red, green, blue and white sub-pixels. A data converter that converts input data of three colors into input data of four colors. A data driver converts the input data of four colors into a video signal, and supplies the video signal to each sub-pixel. A gate driver supplies a scan pulse to each sub-pixel. A timing controller arranges the input data of four colors supplied from the data converter by each frame in four-color data for at least three sub-frames and then supplies the arranged data to the data driver, and generates a sub-frame control signal corresponding to each sub-frame. A backlight unit includes at least one lamp and at least two LEDs to emit the light to the LCD panel. A backlight controller controls the backlight unit in accordance with the input data of three colors and the sub-frame control signal.

In another embodiment, a method for driving an LCD device including an LCD panel provided with red, green, blue and white sub-pixels, the method includes converting input data of three colors into input data of four colors; arranging the four-color data of each frame in four-color input data for at least three sub-frames, and supplying the arranged four-color data to the data driver, and generating a sub-frame control signal corresponding to each sub-frame; supplying a scan pulse to each sub-pixel; converting the four-color input data into a video signal, and supplying the video signal to each sub-pixel in synchronization with the four-color input data; driving a backlight unit having LEDs of at least five colors in accordance with the three-color input data and the sub-frame control signal, to thereby emit the light to the LCD panel.

In another embodiment, a method for driving an LCD device including an LCD panel provided with red, green, blue and white sub-pixels includes converting input data of three colors into input data of four colors; arranging the four-color data of each frame in four-color input data for at least three sub-frames, and supplying the arranged four-color data to the data driver, and generating a sub-frame control signal corresponding to each sub-frame; supplying a scan pulse to each sub-pixel; converting the four-color input data into a video signal, and supplying the video signal to each sub-pixel in synchronization with the four-color input data; and driving backlight unit having at least one lamp and at least two LEDs in accordance with the three-color input data and the sub-frame control signal, to thereby emit the light to the LCD panel.

It is to be understood that both the foregoing general description and the following detailed description of the present embodiments are exemplary and explanatory and are not intended to limit the claimed subject matter.

BRIEF DESCRIPTION OF THE DRAWINGS

FIG. 1 is a schematic view illustrating an LCD device having RGB sub-pixels of the related art;

FIG. 2 is a schematic view illustrating an LCD device having RGBW sub-pixels arranged in a stripe type of the related art;

FIG. 3 is a schematic view illustrating an LCD device having RGBW sub-pixels arranged in a quad type of the related art;

DETAILED DESCRIPTION

Reference is made in detail to exemplary embodiments, which are illustrated in the accompanying drawings. Wherever possible, the same reference numbers will be used throughout the drawings to refer to the same or like parts.

Figure 4:
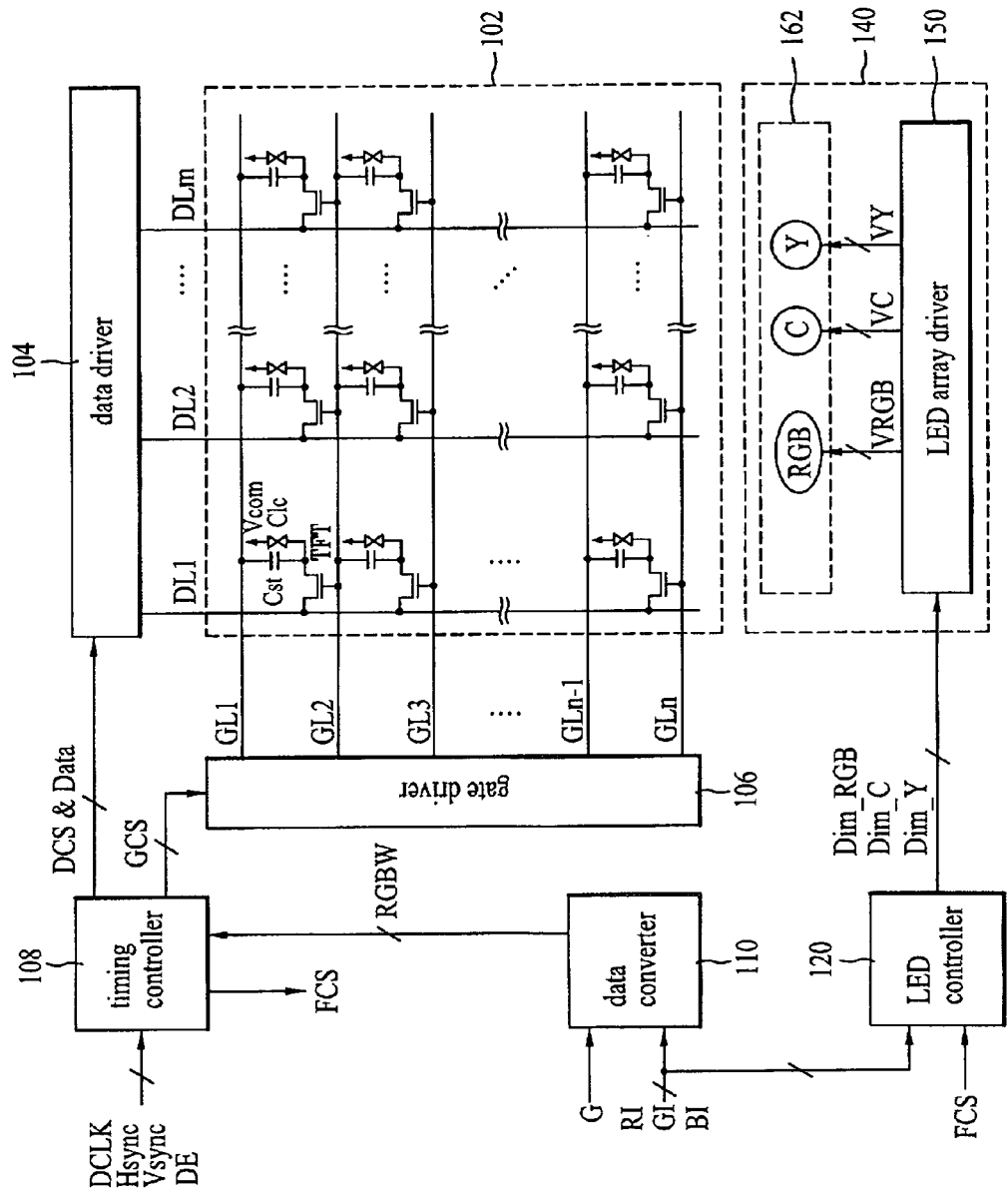
FIG. 4 is a schematic view illustrating an apparatus for driving an LCD device according to a first embodiment.
Figure 5:
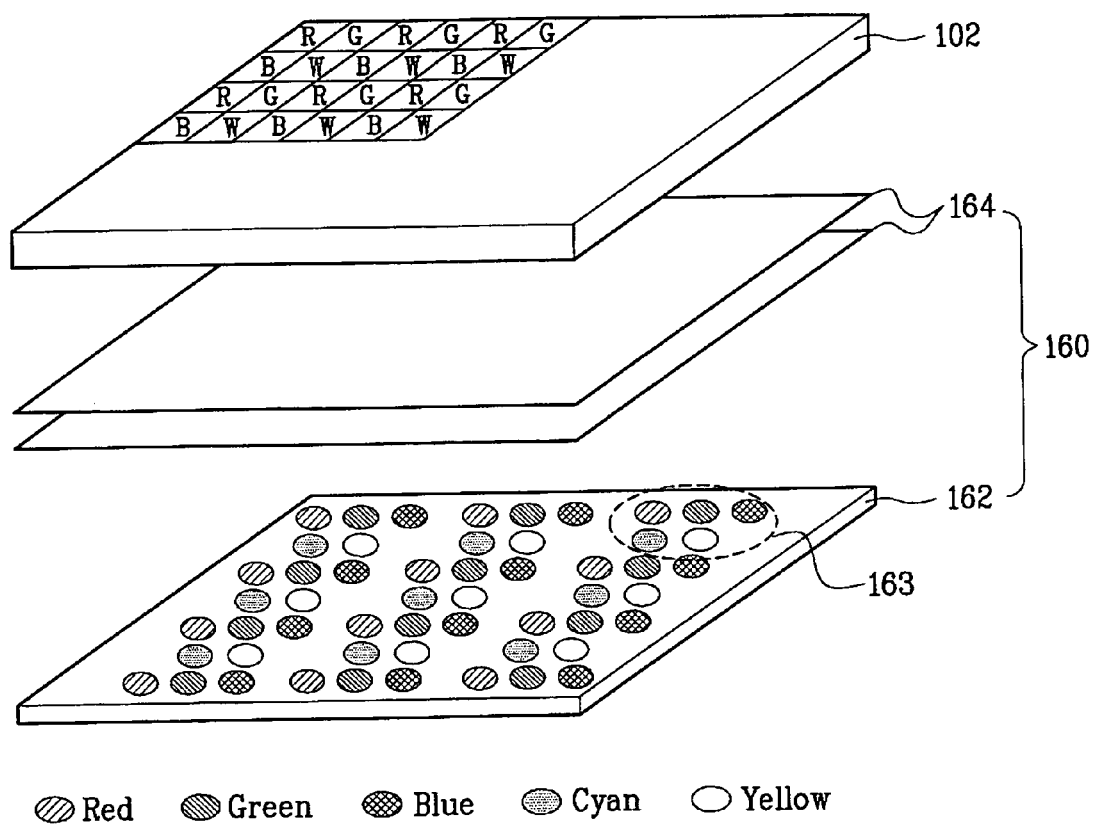
FIG. 5 is a perspective view illustrating an LCD panel and a backlight unit shown in FIG. 4.

In a first embodiment, as shown in FIGS. 4 and 5, an apparatus for driving the LCD device a includes an LCD panel 102 which includes liquid crystal cells formed in respective sub-pixels of four colors defined by n gate lines (GL1 to GLn) and m data lines (DL1 to DLm). A data driver 104 supplies a video signal to the data lines (DL1 to DLm). A gate driver 106 supplies a scan pulse to the gate lines (GL1 to GLn). A data converter 110 converts input data of three colors (RI, GI, BI) to input data of four colors (RGBW). A timing controller 108 arranges the input data of four colors (RGBW) in four-color data (Data) for three sub-frames and then supplies the arranged data to the data driver 104, and generates a sub-frame control signal (FCS) corresponding to each sub-frame. An LED backlight unit 140 includes LEDs of five colors to emit the light to the LCD panel 102. An LED controller 120 controls the LED backlight unit 140 in accordance with the input data of three colors (RI, GI, BI) and the sub-frame control signal (FCS). In one embodiment, the data converter 110 and the LED controller 120 are mounted on the timing controller 108.

The LCD panel 102 includes a plurality of thin film transistors (TFT) which are formed in the respective regions defined by the n gate lines (GL1 to GLn) and the m data lines (DL1 to DLm). The liquid crystal cells are connected with the respective thin film transistors (TFT). Each TFT supplies the data signal provided from the data line (DL1 to DLm) to the liquid crystal cell in response to the scan pulse provided from the gate line (GL1 to GLn). Each liquid crystal cell can be equivalently expressed as a liquid crystal capacitor (Clc) because it is provided with a common electrode facing via the liquid crystal, and a sub-pixel electrode connected with the TFT. The liquid crystal cell includes a storage capacitor (Cst) which maintains the data signal charged on the liquid crystal capacitor (Clc) until the next data signal is charged thereon.

As shown in FIG. 5, the LCD panel 102 includes red(R), green(G), blue(B), and white(W) sub-pixels arranged in a matrix configuration. The red(R), green(G), and blue(B) sub-pixels have corresponding color filters. The white(W) sub-pixel has no color filter. The respective sub-pixels may have the same size ratio, or may have the stripe or quad structure of the different size ratio.

Figure 6:
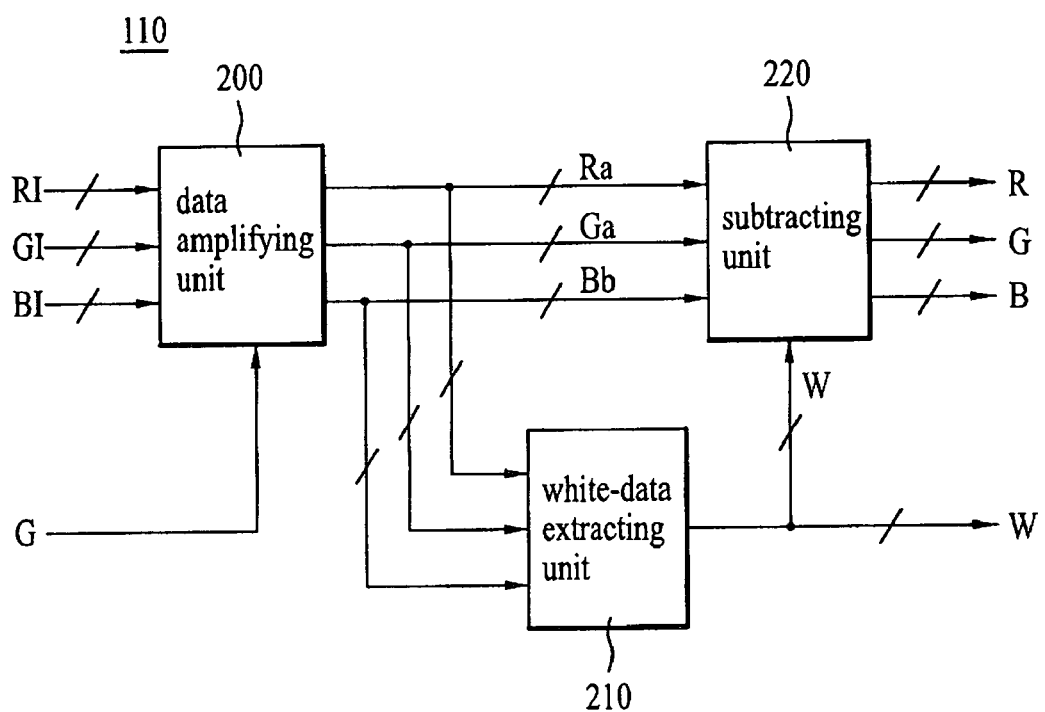
FIG. 6 is a block diagram illustrating a data converter shown in FIG. 4.

As shown in FIG. 6, the data converter 110 is comprised of a data amplifying unit 200, a white-data extracting unit 210, and a subtracting unit 220.

The data amplifying unit 200 generates amplified data of three colors (Ra, Ga, Ba) by respectively multiplying the input data of three colors (RI, GI, BI) inputted externally and a gain value (G) inputted externally, as shown in the following equation 1.

$Ra = RI \times G$ $Ga = GI \times G$ $Ba = BI \times G$ [equation 1]

The white-data extracting unit 210 extracts white data (W) out of the amplified data of three colors (Ra, Ga, Ba) supplied from the data amplifying unit 200, and supplies the white data (W) to the subtracting unit 220. The white data (W) corresponds to common components of the amplified data of three colors (Ra, Ga, Ba), for example, a minimum gray-scale value among gray-scale values of red, green and blue data (Ra, Ga, Ba) The white data (W) may be formed of a difference between the maximum and minimum gray-scale values of the red, green and blue data (Ra, Ga, Ba), or an average gray-scale value.

The subtracting unit 220 subtracts the white data (W) from the amplified data of three colors (Ra, Ga, Ba) supplied from the data amplifying unit 200, to thereby generate three-color data (RGB), as shown in the following equation 2.

$$R = Ra - W$$
$$G = Ga - W$$
$$B = Ba - W \qquad \text{[equation 2]}$$

The data converter 110 converts the white data (W) generated in the white-data extracting unit 210 and the three-color data (RGB) generated in the subtracting unit 220 into four-color data (RGBW), and then supplies the generated four-color data (RGBW) to the timing controller 108.

Figure 7:
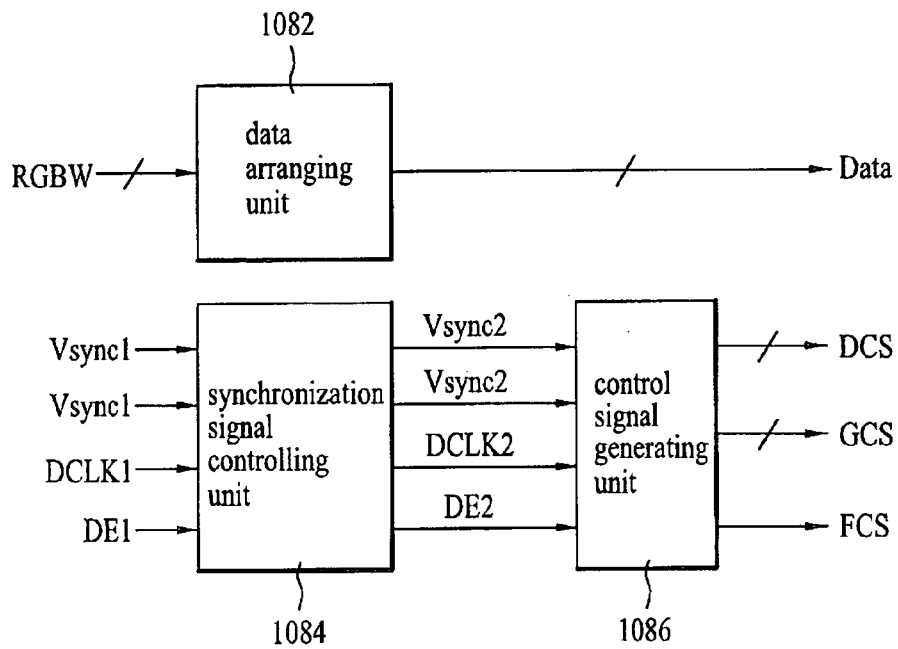
FIG. 7 is a block diagram illustrating a timing controller shown in FIG. 4.

In one embodiment, as shown in FIG. 4, the timing controller 108 is comprised of a data arranging unit 1082, a synchronization signal controlling unit 1084, and a control signal generating unit 1086, as shown in FIG. 7.

The data arranging unit 1082 arranges the four-color data (RGBW) for one frame supplied from the data converter 110 in four-color data (Data) for three sub-frames, and then supplies the arranged four-color data (Data) to the data driver 104.

The synchronization signal controlling unit 1084 converts first vertically and horizontally synchronized signals (Vsync1, Hsync1), a first clock signal (DCLK1), and a first data enable signal (DE1) inputted externally into second vertically and horizontally synchronized signals (Vsync1, Hsync2), a second clock signal (DCLK2), and a second data enable signal (DE2) so as to repeatedly supply the four-color data (RGBW) for one frame to the three sub-frames, and then supplies them to the control signal generating unit 1086.

The control signal generating unit 1086 generates a data control signal (DCS) that controls the data driver 104, and a gate control signal (GCS) that controls the gate driver 106 by using the second vertically and horizontally synchronized signals (Vsync1, Hsync2), the second clock signal (DCLK2), and the second data enable signal (DE2). The control signal generating unit 1086 generates a sub-frame control signal (FCS) to control the LED backlight unit 140 in accordance with the three sub-frames.

In one embodiment, as shown in FIG. 4, the data driver 104 converts the four-color data (Data) arranged in the timing controller 108 into an analog video signal in accordance with the data control signal (DCS) supplied from the timing controller 108, and then supplies the analog video signal for one horizontal period to the data lines (DL1 to DLm) by one horizontal period that supplies the scan pulse to the gate lines (GL1 to GLn). The data driver 104 divides one frame into the first to third sub-frames in accordance with the data control signal (DCS), and supplies the video signal to each of the data lines (DL1 to DLm).

The gate driver 106 includes a shift register which sequentially generates the scan pulse, for example, a gate high pulse in response to a gate start pulse (GSP) and a gate shift clock (GSC) of the gate control signal (GCS). The TFT is turned-on in response to the scan pulse. The gate driver 106 divides one frame into the first to third sub-frames in accordance with the gate control signal (GCS), and sequentially supplies the scan pulse to the gate lines (GL1 to GLn).

The LED controller 120 controls the LED backlight unit 140 to correspond with the three sub-frames in accordance with the sub-frame control signal (FCS).

Figure 8:
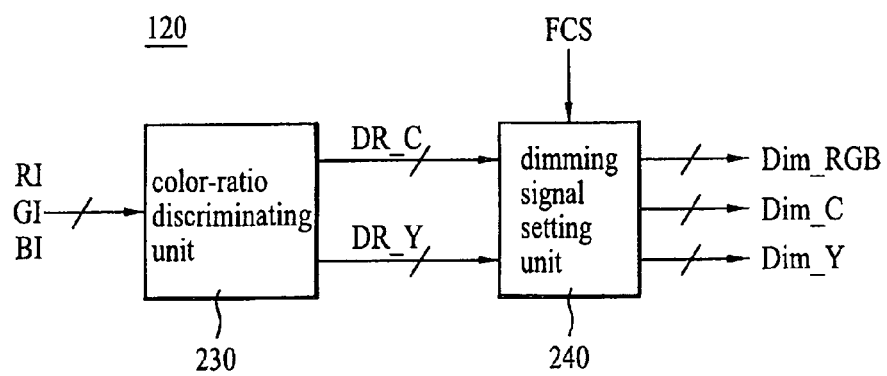
FIG. 8 is a block diagram illustrating an LED controller shown in FIG. 4.

As shown in FIG. 8, the LED controller 120 includes a color-ratio discriminating unit 122 and a dimming signal setting unit 124.

The color-ratio discriminating unit 122 generates a cyan-color ratio signal (DR_C) based on a cyan-color ratio, and a yellow-color ratio signal (DR_Y) based on a yellow-color ratio from the three-color data of one frame (RI, GI, BI) inputted externally.

The cyan-color ratio signal (DR_C) is generated by the ratio of green and blue colors, as shown in the following equation 3.

$$DR\_C \propto \frac{G}{R} : \frac{B}{R} \qquad \text{[equation 3]}$$

The yellow-color ratio signal (DR_Y) is generated by the ratio of green and red colors, as shown in the following equation 4.

$$DR\_Y \propto \frac{G}{B} : \frac{R}{B} \qquad \text{[equation 4]}$$

The dimming signal setting unit 124 sets a cyan-color dimming signal (Dim_C) corresponding to the cyan-color ratio signal (DR_C) supplied from the color-ratio discriminating unit 122 in accordance with the sub-frame control signal (FCS), and supplies the generated cyan-color dimming signal (Dim_C) to the LED backlight unit 140. The dimming signal setting unit 124 sets a yellow-color dimming signal (Dim_Y) corresponding to the yellow-color ratio signal (DR_Y) supplied from the color-ratio discriminating unit 112 in accordance with the sub-frame control signal (FCS), and supplies the generated yellow-color dimming signal (Dim_Y) to the LED backlight unit 140.

The dimming signal setting unit 124 generates three-color (RGB) dimming signals (Dim_RGB) set in correspondence with a white balance in accordance with the sub-frame control signal (FCS), and supplies the generated dimming signals (Dim_RGB) to the LED backlight unit 140.

In one embodiment, as shown in FIG. 4, the LED backlight unit 140 includes an LED array 162 which is comprised of a plurality of LED groups 163 provided with red, green and blue LEDs (RGB), and cyan and yellow LEDs (C, Y). An LED array driver 150 which drives the plurality of LED groups 163, which is shown in FIG. 5

The LED array driver 150 generates three-color light emission signals (VRGB) in accordance with the three-color dimming signals (Dim_RGB), to thereby drive the LEDs of red, green and blue colors (RGB) of the LED groups 163.

The LED array driver 150 drives the cyan LED (C) by generating a cyan-color light emission signal (VC) corresponding to the cyan-color dimming signal (Dim_C) supplied from the LED controller 120. The LED array driver 150 drives the yellow LED (Y) by generating a yellow-color light emission signal (VY) corresponding to the yellow-color dimming signal (Dim_Y) supplied from the LED controller 120.

The LED array 162 is positioned in opposite to the rear surface of the LCD panel 102.

The plurality of LED groups 163 are arranged on a printed circuit board (PCB) in a matrix configuration to thereby uniformly provide the light to the entire rear surface of the LCD panel 102.

In one embodiment, the plurality of LED groups 163 includes the red, green and blue LEDs which generate the white light the cyan LED (C) which emits the cyan light; and the yellow LED (Y) which emits the yellow light.

The three-color LEDs (RGB) of red, green and blue colors mix the red, green and blue light in accordance with the three-color light emission signals (VRGB), thereby generating the white light. The red LED (R) is driven in accordance with the red-color light emission signal of the three-color light emission signals (VRGB), thereby emitting the red light. The green LED (G) is driven in accordance with the green-color light emission signal of the three-color light emission signals (VRGB), thereby emitting the green light. The blue LED (B) is driven in accordance with the blue-color light emission signal of the three-color light emission signals (VRGB), thereby emitting the blue light.

The cyan LED (C) is driven in accordance with the cyan-color light emission signal (VC) supplied from the LED array driver 150, thereby generating the cyan light. The yellow LED (Y) is driven in accordance with the yellow-color light emission signal (VY) supplied from the LED array driver 150, thereby generating the yellow light.

In one embodiment, the LED backlight unit 140 applies the white light, the cyan light and the yellow light, generated from the respective LED groups 163 in accordance with the three sub-frames, to the LCD panel 102.

In one embodiment, the backlight unit 140 further includes a plurality of optical sheets 164 provided between the LED array 162 and the LCD panel 102. The plurality of optical sheets 164 includes at least one diffusion sheet (or diffusion plate) which diffuses the incident light from the LED array 162; and at least one prism sheet which changes the path of light diffused in the diffusion sheet toward the LCD panel 102 to thereby improve the efficiency of light.

Figure 9:
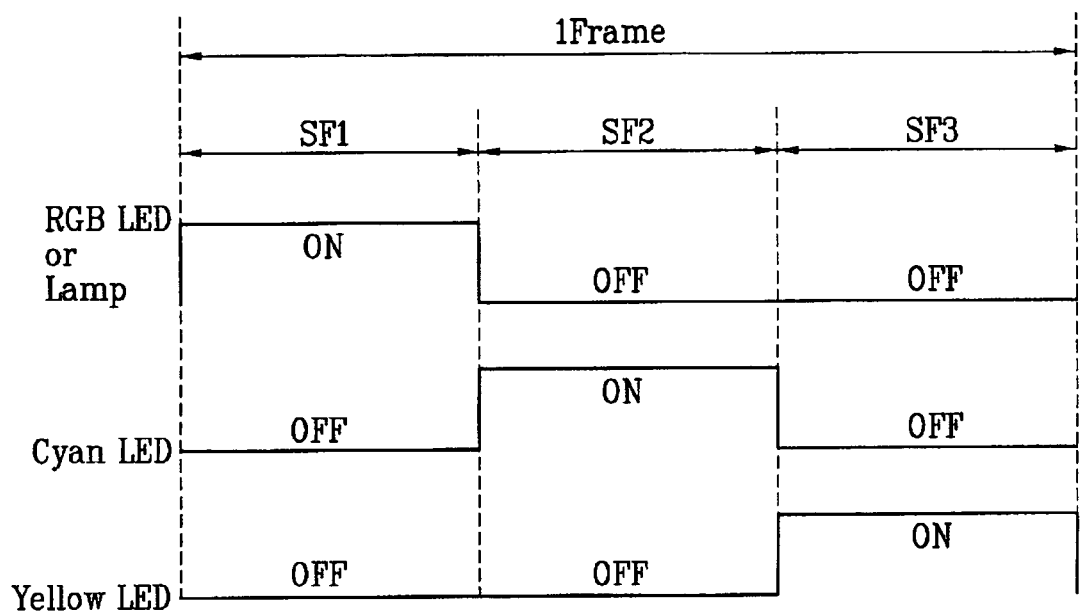
FIG. 9 is a waveform diagram illustrating a method for driving an LCD device according to one embodiment.

FIG. 9 is a waveform diagram illustrating a method for driving an LCD device according to the first embodiment.

The method for driving the LCD device according to the first embodiment is explained with reference to FIG. 9 in association with FIG. 4.

The three-color input data (RGB) externally inputted by each frame is converted into the four-color data (RGBW). The converted four-color data (RGBW) is arranged in each of the first to third sub-frames (SF1 to SF3). The sub-frame control signal (FCS) is generated in correspondence with each of the first to third sub-frames (SF1 to SF3). Based on equation 3, the cyan-color dimming signal (Dim_C) is generated in accordance with the cyan-color ratio of the three-color input data (RGB) Based on equation 4, the yellow-color dimming signal (Dim_Y) is generated in accordance with the yellow-color ratio of the three-color input data (RGB).

The converted four-color data (RGBW) of the first to third sub-frames (SF1 to SF3) is supplied to the LCD panel 102. The white light generated by mixing the red, green and blue light, the cyan light and the yellow light is sequentially supplied to the LCD panel 102 by controlling the LED backlight unit 140 in accordance with the sub-frame control signal (FCS) corresponding to the first to third sub-frames (SF1 to SF3).

In the first sub-frame (SF1) of one frame, the video signal corresponding to the four-color data (RGBW) is supplied to the LCD panel 102, and the three-color LEDs (RGB) of the LED groups 163 are driven in accordance with the three-color light emission signals (VRGB), whereby the white light is applied to the LCD panel 102. In case of the first sub-frame (SF1), the cyan and yellow LEDs (C, Y) of the LED groups 163 are maintained in the off-state by the sub-frame control signal (FCS). Accordingly, in case of the first sub-frame (SF1), the white light generated from the three-color LEDs (RGB) is transmitted through the red, green and blue sub-pixels (R, G, B), whereby the red, green and blue light is mixed with the white light transmitted through the white sub-pixel (W). Accordingly, the color image corresponding to the four-color data (RGBW) is displayed on the LCD panel 102.

In the second sub-frame (SF2) of one frame, the video signal corresponding to the four-color data (RGBW) is supplied to the LCD panel 102, and the cyan LED (C) of the LED groups 163 is driven in accordance with the cyan-color light emission signal (VC), whereby the cyan light is applied to the LCD panel 102. In case of the second sub-frame (SF2), the three-color LEDs (RGB) and the yellow LED (Y) are maintained in the off-state by the sub-frame control signal (FCS). Accordingly, in case of the second sub-frame (SF2), the cyan light generated from the cyan LED (C) is transmitted through the white sub-pixel (W), whereby a cyan-color image corresponding to the cyan-color ratio of the three-color data (RGB) is displayed on the LCD panel 102. The cyan light emitted from the cyan LED (C) is transmitted through only the white sub-pixel (W) having no color filter without being transmitted through the red, green and blue sub-pixels (R, G, B).

In the third sub-frame (SF3) of one frame, the video signal corresponding to the four-color data (RGBW) is supplied to the LCD panel 102, and the yellow LED (Y) of the LED groups 163 is driven in accordance with the yellow-color light emission signal (VY), whereby the yellow light is applied to the LCD panel 102. In case of the third sub-frame (SF3), the three-color LEDs (RGB) and the cyan LED (C) are maintained in the off-state by the sub-frame control signal (FCS). Accordingly, in case of the third sub-frame (SF3), the yellow light generated from the yellow LED (Y) is transmitted through the white sub-pixel (W), whereby a yellow-color image corresponding to the yellow-color ratio of the three-color data (RGB) is displayed on the LCD panel 102. The yellow light emitted from the yellow LED (Y) is transmitted through only the white sub-pixel (W) having no color filter without being transmitted through the red, green and blue sub-pixels (R, G, B).

In the apparatus and method for driving the LCD device according to the first embodiment, the same four-color data (RGBW) is supplied to the LCD panel 102 for each of the first to third sub-frames (SF1 to SF3), however, it is not limited to this. For example, in case of the first sub-frame (SF1), the three-color data (RGB) of the four-color data (RGBW) is supplied to the red, green and blue sub-pixels of the LCD panel 102, and the three-color LEDs (RGB) are driven in synchronization with the three-color data (RGB). In the second sub-frame (SF2), the white data (W) of the four-color data (RGBW) is supplied to the white sub-pixel of the LCD panel 102, and the cyan LED (C) is driven in synchronization with the white data (W). In the third sub-frame, the white data (W) of the four-color data (RGBW) is supplied to the white sub-pixel of the LCD panel 102, and the yellow LED (Y) is driven in synchronization with the white data (W).

In the apparatus and method for driving the LCD device according to the first embodiment, the plurality of LED groups 163 of the LED array 162 may be provided with the red, green and blue LEDs (R, G, B) and any two of the cyan, yellow or magenta LEDs (C, Y, M).

In the apparatus and method for driving the LCD device according to the first embodiment, which uses the LEDs of five colors (RGB, C, Y), the white light generated by mixing the red, green and blue light, the cyan light generated based on the cyan-color ratio (C) of the input data (RI, GI, BI), and the yellow light generated based on the yellow-color ratio (Y) of the input data (RI, GI, BI) is supplied to the LCD panel 102 by each sub-frame, so that it is possible to improve the color realization ratio by multi-primary.

Figure 10:
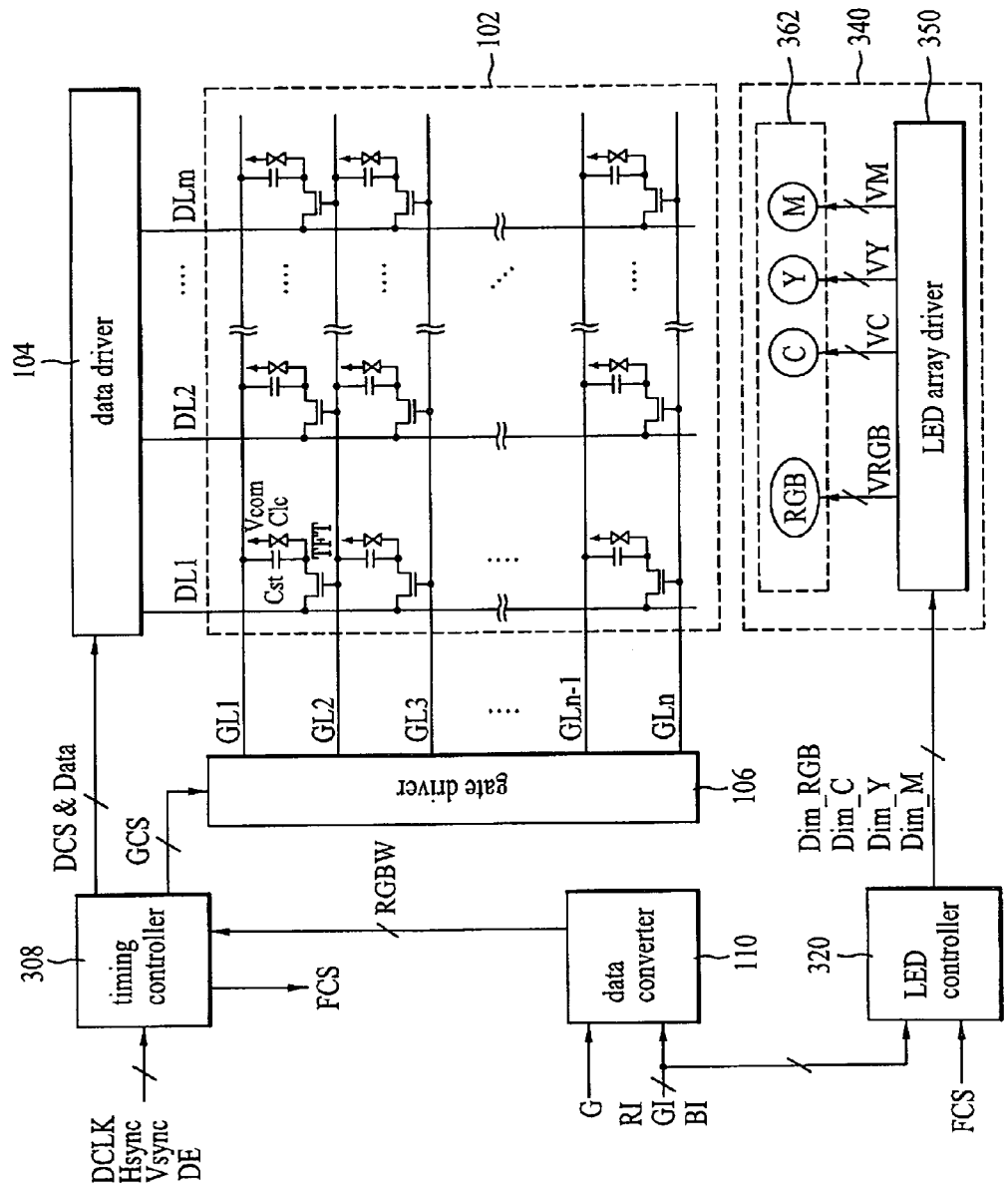
FIG. 10 is a schematic view illustrating an apparatus for driving an LCD device according to a second embodiment.
Figure 11:
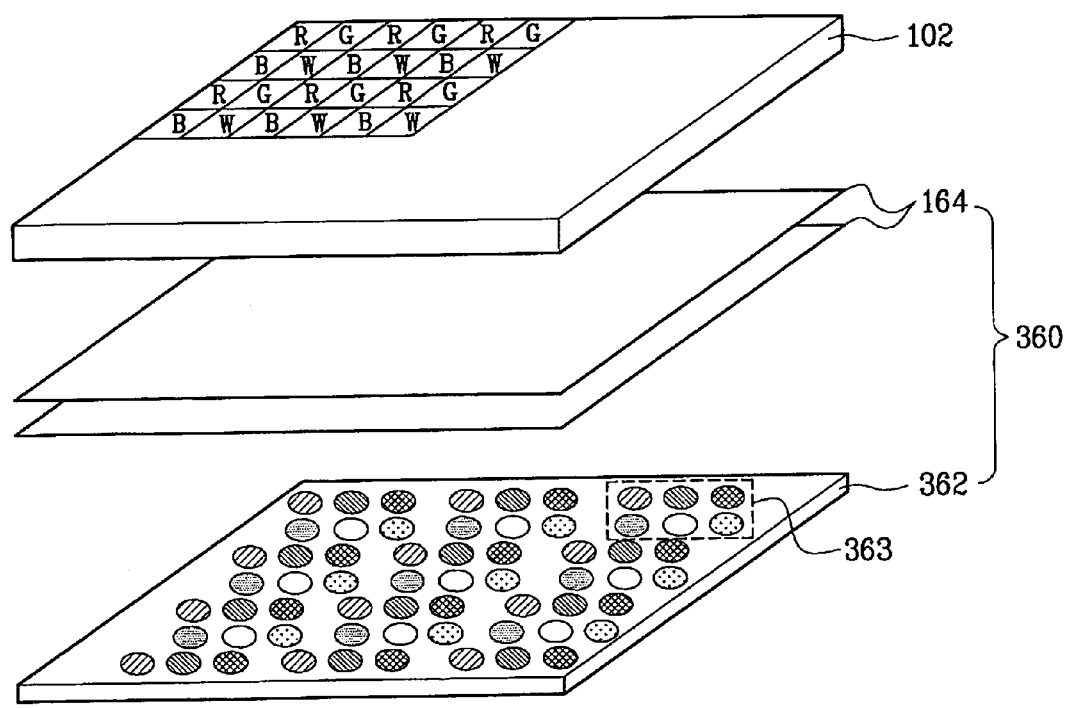
FIG. 11 is a perspective view illustrating an LCD panel and a backlight unit shown in FIG. 10.

In one embodiment, as shown in FIGS. 10 and 11, the apparatus for driving the LCD device according to the second embodiment includes an LCD panel 102 that includes liquid crystal cells formed in respective sub-pixels of four colors defined by n gate lines (GL1 to GLn) and m data lines (DL1 to DLm). A data driver 104 supplies a video signal to the data lines (DL1 to DLm). A gate driver 106 supplies a scan pulse to the gate lines (GL1 to GLn). A data converter 110 converts input data of three colors (RI, GI, BI) to input data of four colors (RGBW). A timing controller 308 arranges the input data of four colors (RGBW) supplied from the data converter 110 by each frame in four-color data (Data) for four sub-frames and then supplies the arranged data to the data driver 104, and generates a sub-frame control signal (FCS) corresponding to each sub-frame. An LED backlight unit 340 includes LEDs of six colors that emit the light to the LCD panel 102. An LED controller 320 controls the LED backlight unit 340 in accordance with the input data of three colors (RI, GI, BI) and the sub-frame control signal (FCS) In one embodiment, the data converter 110 and the LED controller 320 is mounted on the timing controller 308.

In one embodiment, except the timing controller 308, the LED controller 320 and the LED backlight unit 340, the driving apparatus according to the second embodiment is substantially similar in structure to that of the first embodiment shown in FIG. 4. Accordingly, the following explanation for the second embodiment will be focused on the timing controller 308, the LED controller 320 and the LED backlight unit 340, and the other portions of the LCD device according to the second embodiment will be substituted by the above explanation of the first embodiment.

In one embodiment, the timing controller 308 arranges the four-color input data (RGBW) supplied from the data converter 110 by each frame in the four-color data (Data) for the fourth sub-frames, and supplies the arranged data to the data driver 104, thereby generating the sub-frame control signal (FCS) corresponding to each sub-frame.

Figure 12:
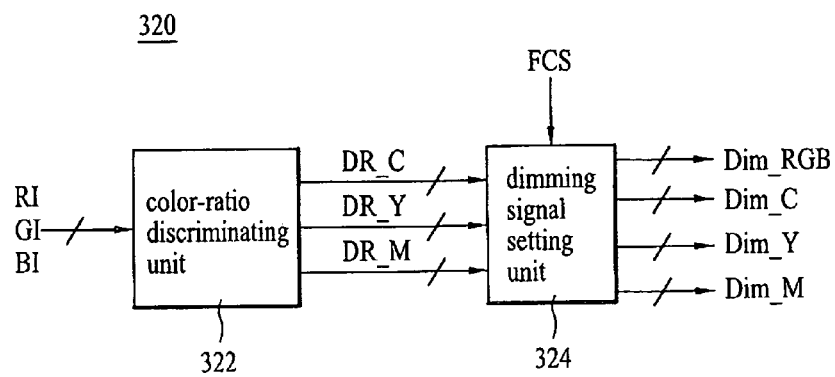
FIG. 12 is a block diagram illustrating an LED controller shown in FIG. 10.

In one embodiment, as shown in FIG. 12, the LED controller 320 includes a color-ratio discriminating unit 322 and a dimming signal setting unit 324.

The color-ratio discriminating unit 322 generates a cyan-color ratio signal (DR_C) based on a cyan-color ratio, a yellow-color ratio signal (DR_Y) based on a yellow-color ratio, and a magenta-color ratio signal (DR_M) based on a magenta-color ratio from the three-color data of one frame (RI, GI, BI) inputted externally.

The cyan-color ratio signal (DR_C) is generated by the ratio of green and blue colors, as shown in the above equation 3. The yellow-color ratio signal (DR_Y) is generated by the ratio of green and red colors, as shown in the above equation 4. The magenta-color ratio signal (DR_M) is generated by the ratio of red and blue colors, as shown in equation 5.

$$DR\_M \propto \frac{R}{G} : \frac{B}{G}$$ [equation 5]

The dimming signal setting unit 324 sets a cyan-color dimming signal (Dim_C) corresponding to the cyan-color ratio signal (DR_C) supplied from the color-ratio discriminating unit 322 in accordance with the sub-frame control signal (FCS), and supplies the generated cyan-color dimming signal (Dim_C) to the LED backlight unit 340. The dimming signal setting unit 324 sets a yellow-color dimming signal (Dim_Y) corresponding to the yellow-color ratio signal (DR_Y) supplied from the color-ratio discriminating unit 322 in accordance with the sub-frame control signal (FCS), and supplies the generated yellow-color dimming signal (Dim_Y) to the LED backlight unit 340. The dimming signal setting unit 324 sets a magenta-color dimming signal (Dim_M) corresponding to the magenta-color ratio signal (DR_M) supplied from the color-ratio discrimination unit 322 in accordance with the sub-frame control signal (FCS), and supplies the generated magenta-color dimming signal (Dim_M) to the LED backlight unit 340.

The dimming signal setting unit 324 generates the three-color dimming signals (Dim-RGB) corresponding to a white balance in accordance with the sub-frame control signal (FCS), and supplies the generated three-color dimming signals (Dim_RGB) to the LED backlight unit 340.

In one embodiment, as shown in FIG. 10, the LED backlight unit 340 includes an LED array 362 that includes a plurality of LED groups 363 provided with red, green and blue LEDs (RGB), and cyan, yellow or magenta LEDs (C, Y, M); and an LED array driver 350 which drives the LED array 362, which is fully shown in FIG. 11.

The LED array driver 350 generates three-color light emission signals (VRGB) in accordance with the three-color dimming signals (Dim_RGB), to thereby drive the LEDs of three colors (RGB) of the LED groups 363.

The LED array driver 350 drives the cyan LED (C) by generating a cyan-color light emission signal (VC) corresponding to the cyan-color dimming signal (Dim_C) supplied from the LED controller 320. The LED array driver 350 drives the yellow LED (Y) by generating a yellow-color light emission signal (VY) corresponding to the yellow-color dimming signal (Dim_Y) supplied from the LED controller 320. The LED array driver 350 drives the magenta LED (M) by generating a magenta-color light emission signal (VM) corresponding to the magenta-color dimming signal (Dim_M) supplied from the LED controller 320.

The LED array 362 is positioned in opposite to the rear surface of the LCD panel 102.

The plurality of LED groups 363 are arranged on a printed circuit board (PCB) in a matrix configuration to thereby uniformly provide the light to the entire rear surface of the LCD panel 102.

The plurality of LED groups 363 are provided with the red, green and blue LEDs which generate the white light; the cyan LED (C) which emits the cyan light; the yellow LED (Y) which emits the yellow light; and the magenta LED (M) which emits the magenta light.

The three-color LEDs (RGB) of red, green and blue colors mix the red, green and blue light in accordance with the three-color light emission signals (VRGB), thereby generating the white light. The red LED (R) is driven in accordance with the red-color light emission signal of the three-color light emission signals (VRGB) supplied from the LED array driver 350, thereby emitting the red light. The green LED (G) is driven in accordance with the green-color light emission signal of the three-color light emission signals (VRGB) supplied from the LED array driver 350, thereby emitting the green light. The blue LED (B) is driven in accordance with the blue-color light emission signal of the three-color light emission signals (VRGB) supplied from the LED array driver 350, thereby emitting the blue light.

The cyan LED (C) is driven in accordance with the cyan-color light emission signal (VC) supplied from the LED array driver 350, thereby emitting the cyan light. The yellow LED (Y) is driven in accordance with the yellow-color light emission signal (VY) supplied from the LED array driver 350, thereby emitting the yellow light. The magenta LED (M) is driven in accordance with the magenta-color light emission signal (VM) supplied from the LED array driver 350, thereby emitting the magenta light.

The LED backlight unit 340 applies the white light, the cyan light, the yellow light and the magenta light, generated from the respective LED groups 363 in accordance with the fourth sub-frames, to the LCD panel 102.

The backlight unit 340 further includes a plurality of optical sheets 164 provided between the LED array 362 and the LCD panel 102. The plurality of optical sheets 164 include at least one diffusion sheet (or diffusion plate) which diffuses the incident light from the LED array 362; and at least one prism sheet which changes the path of light diffused in the diffusion sheet toward the LCD panel 102 to improve the efficiency of light.

Figure 13:
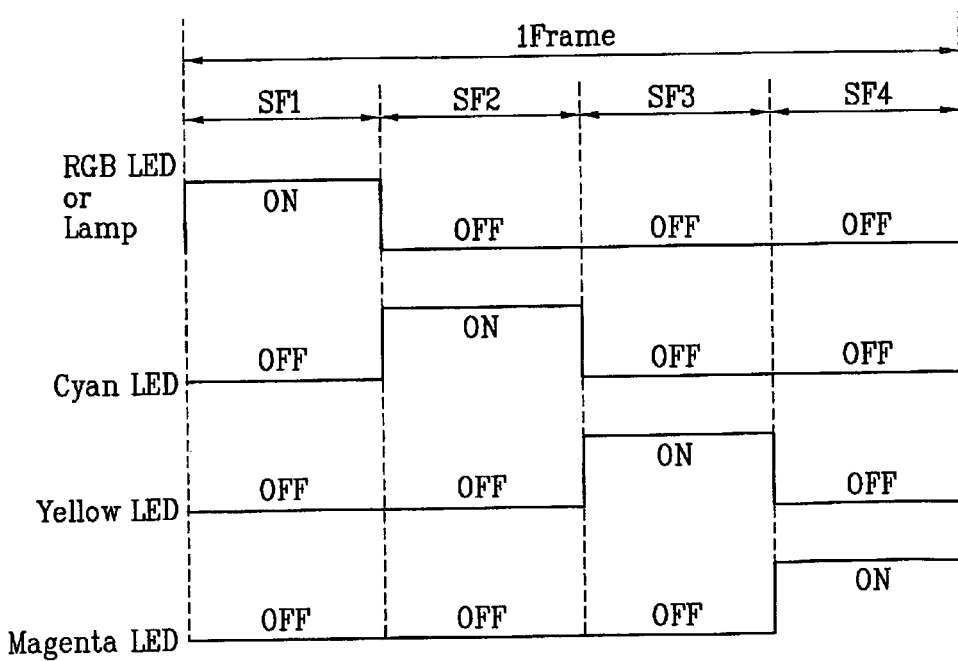
FIG. 13 is a waveform diagram illustrating a method for driving an LCD device according to another embodiment.

Referring to FIG. 13 in association with FIG. 10, the method for driving the LCD device according to the second embodiment will be explained as follows. FIG. 13 illustrates a method for driving an LCD device according to the second embodiment of the present invention.

The three-color input data (RGB) externally inputted by each frame is converted into the four-color data (RGBW). The converted four-color data (RGBW) is arranged in each of the first to fourth sub-frames (SF1 to SF4). The sub-frame control signal (FCS) is generated in correspondence with each of the first to fourth sub-frames (SF1 to SF4). Based on equation 3, the cyan-color dimming signal (Dim_C) is generated in accordance with the cyan-color ratio of the three-color input data (RGB). Based on equation 4, the yellow-color dimming signal (Dim_Y) is generated in accordance with the yellow-color ratio of the three-color input data (RGB). Based on equation 5, the magenta-color dimming signal (Dim_M) is generated in accordance with the magenta-color ratio of the three-color input data (RGB).

The converted four-color data (RGBW) is supplied to the LCD panel 102 by the first to fourth sub-frames (SF1 to SF4). The white light generated by mixing the red, green and blue light, the cyan light, the yellow light and the magenta light is sequentially supplied to the LCD panel 102 by controlling the LED backlight unit 340 in accordance with the sub-frame control signal (FCS) corresponding to the first to fourth sub-frames (SF1 to SF4).

In the first sub-frame (SF1) of one frame, the video signal corresponding to the four-color data (RGBW) is supplied to the LCD panel 102, and the three-color LEDs (RGB) of the LED groups 363 are driven in accordance with the three-color light emission signals (VRGB), whereby the white light is applied to the LCD panel 102. In case of the first sub-frame (SF1), the cyan, yellow and magenta LEDs (C, Y, M) of the LED groups 363 are maintained in the off-state by the sub-frame control signal (FCS). Accordingly, in case of the first sub-frame (SF1), the white light generated from the three-color LEDs (RGB) is transmitted through the red, green and blue sub-pixels (R, G, B), whereby the red, green and blue light is mixed with the white light transmitted through the white sub-pixel (W). Accordingly, the color image corresponding to the four-color data (RGBW) is displayed on the LCD panel 102.

In the second sub-frame (SF2) of one frame, the video signal corresponding to the four-color data (RGBW) is supplied to the LCD panel 102, and the cyan LED (C) of the LED groups 363 is driven in accordance with the cyan-color light emission signal (VC), whereby the cyan light is applied to the LCD panel 102. In case of the second sub-frame (SF2), the three-color LEDs (RGB), the yellow LED (Y) and the magenta LED (M) are maintained in the off-state by the sub-frame control signal (FCS). Accordingly, in case of the second sub-frame (SF2), the cyan light generated from the cyan LED (C) is transmitted through the white sub-pixel (W), whereby a cyan-color image corresponding to the cyan-color ratio of the three-color data (RGB) is displayed on the LCD panel 102. The cyan light emitted from the cyan LED (C) is transmitted through only the white sub-pixel (W) having no color filter without being transmitted through the red, green and blue sub-pixels (R, G, B).

In the third sub-frame (SF3) of one frame, the video signal corresponding to the four-color data (RGBW) is supplied to the LCD panel 102, and the yellow LED (Y) of the LED groups 363 is driven in accordance with the yellow-color light emission signal (VY), whereby the yellow light is applied to the LCD panel 102. In case of the third sub-frame (SF3), the three-color LEDs (RGB), the cyan LED (C) and the magenta LED (M) are maintained in the off-state by the sub-frame control signal (FCS). Accordingly, in case of the third sub-frame (SF3), the yellow light generated from the yellow LED (Y) is transmitted through the white sub-pixel (W), whereby a yellow-color image corresponding to the yellow-color ratio of the three-color data (RGB) is displayed on the LCD panel 102. The yellow light emitted from the yellow LED (Y) is transmitted through only the white sub-pixel (W) having no color filter without being transmitted through the red, green and blue sub-pixels (R, G, B)

In the fourth sub-frame (SF4) of one frame, the video signal corresponding to the four-color data (RGBW) is supplied to the LCD panel 102, and the magenta LED (M) of the LED groups 363 is driven in accordance with the magenta-color light emission signal (VM), whereby the magenta light is applied to the LCD panel 102. In case of the fourth sub-frame (SF4), the three-color LEDs (RGB), the cyan LED (C) and the yellow LED (Y) are maintained in the off-state by the sub-frame control signal (FCS). Accordingly, in case of the fourth sub-frame (SF4), the magenta light generated from the magenta LED (M) is transmitted through the white sub-pixel (W), whereby a magenta-color image corresponding to the magenta-color ratio of the three-color data (RGB) is displayed on the LCD panel 102. The magenta light emitted from the magenta LED (M) is transmitted through only the white sub-pixel (W) having no color filter without being transmitted through the red, green and blue sub-pixels (R, G, B).

In the apparatus and method for driving the LCD device according to the second embodiment, the same four-color data (RGBW) is supplied to the LCD panel 102 by each of the first to fourth sub-frames (SF1 to SF4), however, it is not limited to this. For example, in case of the first sub-frame (SF1), the three-color data (RGB) of the four-color data (RGBW) is supplied to the red, green and blue sub-pixels of the LCD panel 102, and the three-color LEDs (RGB) are driven in synchronization with the three-color data (RGB). In the second sub-frame (SF2), the white data (W) of the four-color data (RGBW) is supplied to the white sub-pixel of the LCD panel 102, and the cyan LED (C) is driven in synchronization with the white data (W). In the third sub-frame, the white data (W) of the four-color data (RGBW) is supplied to the white sub-pixel of the LCD panel 102, and the yellow LED (Y) is driven in synchronization with the white data (W). In the fourth sub-frame, the white data (W) of the four-color data (RGBW) is supplied to the white sub-pixel of the LCD panel 102, and the magenta LED (M) is driven in synchronization with the white data (W).

In the apparatus and method for driving the LCD device according to the second embodiment which uses the plurality of LED groups 363 provided with the LEDs of six colors (RGB, C, Y, M), the white light generated by mixing the red, green and blue light, the cyan light generated based on the cyan-color ratio (C) of the input data (RI, GI, BI), the yellow light generated based on the yellow-color ratio (Y) of the input data (RI, GI, BI), and the magenta light generated based on the magenta-color ratio (M) of the input data (RI, GI, BI)

is supplied to the LCD panel 102 by each sub-frame, so that it is possible to improve the color realization ratio by multi-primary.

Figure 14:
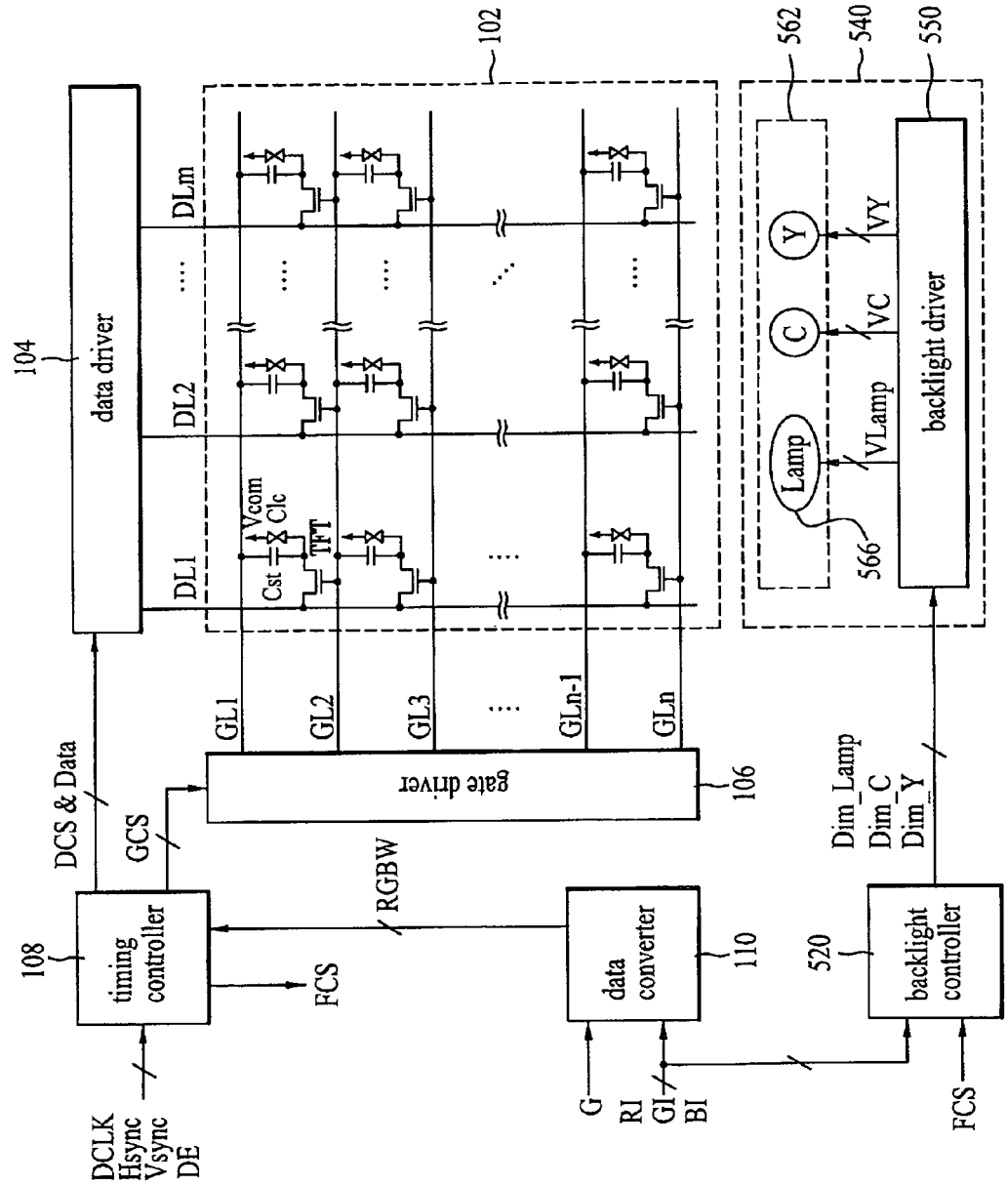
FIG. 14 is a schematic view illustrating an apparatus for driving an LCD device according to a third embodiment.

In a third embodiment, as shown in FIG. 14, the apparatus for driving the LCD device a includes an LCD panel 102 which is comprised of liquid crystal cells formed in respective sub-pixels of four colors defined by n gate lines (GL1 to GLn) and m data lines (DL1 to DLm). A data driver 104 supplies a video signal to the data lines (DL1 to DLm). A gate driver 106 supplies a scan pulse to the gate lines (GL1 to GLn). A data converter 110 converts input data of three colors (RI, GI, BI) to input data of four colors (RGBW). A timing controller 108 arranges the input data of four colors (RGBW) supplied from the data converter 110 by each frame in four-color data (Data) for three sub-frames and then supplies the arranged data to the data driver 104, and generates a sub-frame control signal (FCS) corresponding to each sub-frame. A backlight unit 540 includes a lamp 566 and LEDs of two colors (C, Y) to emit the light to the LCD panel 102. A backlight controller 520 controls the backlight unit 540 in accordance with the input data of three colors (RI, GI, BI) and the sub-frame control signal (FCS). In one embodiment, the data converter 110 and the backlight controller 520 are mounted on the timing controller 108.

Except the backlight unit 540 and the backlight controller 520, the driving apparatus according to the third embodiment is identical in structure to that of the first embodiment shown in FIG. 4. Accordingly, the following explanation for the third embodiment will be focused on the backlight unit 540 and the backlight controller 520, and the other portions of the LCD device according to the third embodiment will be substituted by the above explanation of the first embodiment.

The backlight controller 520 generates a lamp dimming signal (Dim_Lamp) to drive the lamp 566 in accordance with the sub-frame control signal (FCS), and also generates a cyan-color dimming signal (Dim_C) and a yellow-color dimming signal (Dim_Y) to drive the LEDs of two colors (C, Y) in accordance with the sub-frame control signal (FCS). The backlight controller 520 supplies the generated dimming signals (Dim_Lamp, Dim_C, Dim_Y) to the backlight unit 540.

In one embodiment, the backlight controller 520 includes a color-ratio discriminating unit 122 and a dimming signal setting unit 124, as shown in FIG. 8, to thereby generate the cyan-color dimming signal (Dim_C) and the yellow-color dimming signal (Dim_Y) in accordance with the sub-frame control signal (FCS).

The detailed explanation for the color-ratio discriminating unit 122 and the dimming signal setting unit 124 is similar to the description of FIG. 8.

The backlight unit 540 includes a backlight array 562 which is comprise of the lamp 566, the cyan LED (C) and the yellow LED (Y); and a backlight driver 550 which drives the backlight array 562.

The backlight driver 550 generates a lamp-driving signal (VLamp) in accordance with the lamp dimming signal (Dim_Lamp) supplied from the backlight controller 520, to thereby drive the lamp 566. The backlight driver 550 generates a cyan-color light emission signal (VC) in accordance with the cyan-color dimming signal (Dim_C) supplied from the backlight controller 520, to thereby drive the cyan LED (C). The backlight driver 550 generates a yellow-color light emission signal (VY) in accordance with the yellow-color dimming signal (Dim_Y) supplied from the backlight controller 520, to thereby drive the yellow LED (Y).

Figure 15:
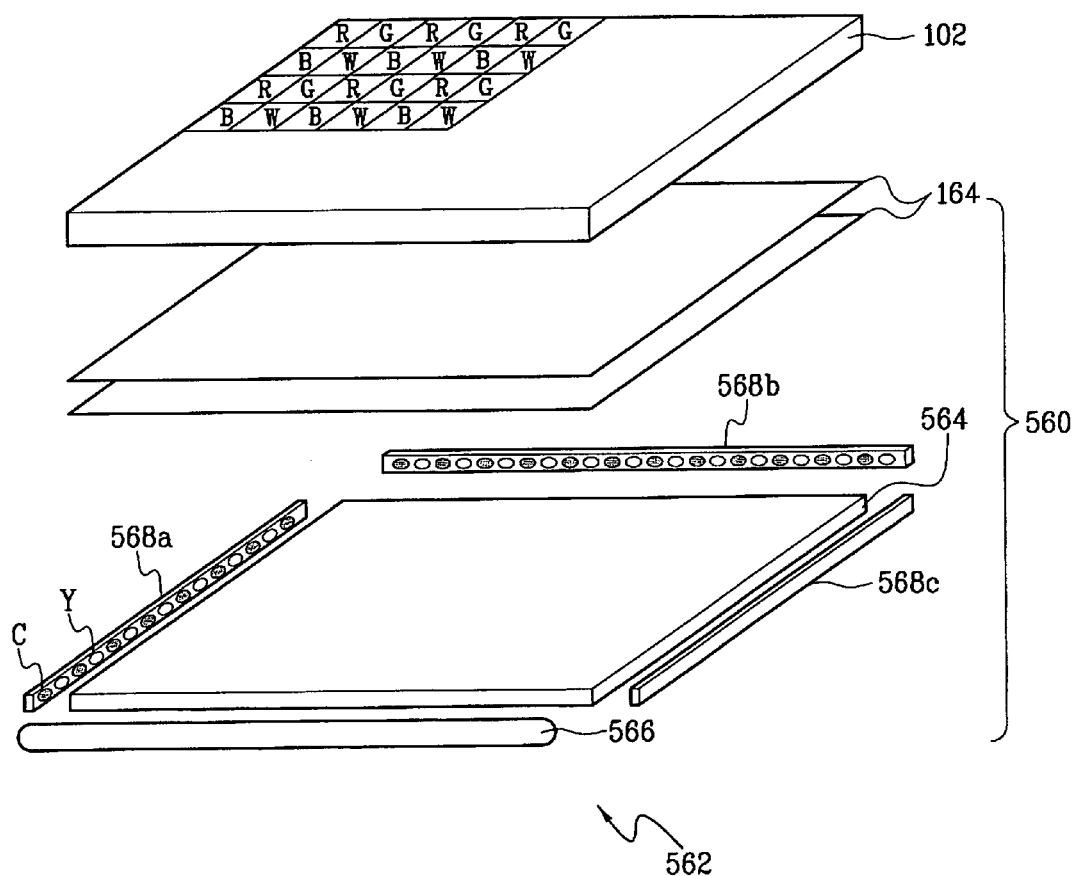
FIG. 15 is a perspective view illustrating a first example of a backlight unit in the LCD device.

FIG. 15 is a perspective view illustrating a first example of a backlight unit in the LCD device according to the third embodiment shown in FIG. 14.

In one embodiment, as shown in FIG. 15 in association with FIG. 14, the backlight array 562 includes a light-guiding plate 564 which is provided with incidence sides formed at the lateral side thereof to guide the incident light toward the LCD panel 102. A lamp 566 faces the first side of the light-guiding plate 564. First to third LED arrays 568a, 568b, 568c face the second to fourth sides of the light-guiding plate 564. A plurality of optical sheets 164 are arranged above the light-guiding plate 564.

In one embodiment, the lamp 566 faces the first side of the light-guiding plate 564, wherein the lamp 566 is turned-on in accordance with the lamp-driving signal (VLamp) supplied from the backlight driver 550. As driving the lamp 566, the generated white light is applied to the first incidence side corresponding to the first lateral side of the light-guiding plate 564.

Each of the first to third LED arrays 568a, 568b, 568c is provided with the cyan and yellow LEDs (C, Y) repeatedly arranged on a printed circuit board (PCB). The cyan LED (C) of the first to third LED arrays 568a, 568b, 568c is driven in accordance with the cyan-color light emission signal (VC) supplied from the backlight driver 550, thereby generating the cyan light. The yellow LED (Y) of the first to third LED arrays 568a, 568b, 568c is driven in accordance with the yellow-color light emission signal (VY) supplied from the backlight driver 550, thereby generating the yellow light.

The first to third LED arrays 568a, 568b, 568c generate the cyan or yellow light in accordance with the cyan-color light emission signal (VC) or the yellow-color light emission signal (VY), and supply the generated cyan or yellow light to the second to fourth incidence sides corresponding to the second to fourth lateral sides of the light-guiding plate 564.

The incidence sides of the light-guiding plate 564 change the path of light corresponding to white, cyan or yellow light toward the LCD panel 102.

The plurality of optical sheets 164 include at least one diffusion sheet (or diffusion plate) which diffuses the incident light from the light-guiding plate 564; and at least one prism sheet which changes the path of light diffused in the diffusion sheet toward the LCD panel 102 to improve the efficiency of light.

In one embodiment, depending on the size or model of the LCD panel 102, the lamp 566 of the backlight array 562 is provided in at least one side of the light-guiding plate 564, and the LED arrays 568a, 568b, 568c are provided in the remaining sides having no lamp 566. For example, if the LCD panel 102 has the size of 12-inch or less, at least one lamp 566 is provided in one side of the four sides of the light-guiding plate 564, and the LED arrays are provided in the three sides of the light-guiding plate 564. If the LCD panel 102 has the size of 12-inch or more, at least one lamp 566 is provided in the two sides of the light-guiding plate 564, and the LED arrays are provided in the other two sides of the light-guiding plate 564.

The method for driving the LCD device using the driving apparatus according to the third embodiment will be explained with reference to FIG. 9.

The three-color input data (RGB) externally inputted by each frame is converted into the four-color data (RGBW). The converted four-color data (RGBW) is arranged in each of the first to third sub-frames (SF1 to SF3). The sub-frame control signal (FCS) is generated in correspondence with each of the first to third sub-frames (SF1 to SF3). Using equation 3, the cyan-color dimming signal (Dim_C) is generated in accordance with the cyan-color ratio of the three-color input data (RGB). Using equation 4, the yellow-color dimming signal (Dim_Y) is generated in accordance with the yellow-color ratio of the three-color input data (RGB).

The converted four-color data (RGBW) of the first to third sub-frames (SF1 to SF3) is supplied to the LCD panel 102. The white light generated by mixing the red, green and blue light, the cyan light and the yellow light is sequentially supplied to the LCD panel 102 by controlling the backlight unit 540 in accordance with the sub-frame control signal (FCS) corresponding to the first to third sub-frames (SF1 to SF3).

In the first sub-frame (SF1) of one frame, the video signal corresponding to the four-color data (RGBW) is supplied to the LCD panel 102, and the lamp 566 is driven in accordance with the lamp-driving signal (VLamp), whereby the white light is applied to the LCD panel 102 by the light-guiding plate 564. The cyan and yellow LEDs (C, Y) are maintained in the off-state by the sub-frame control signal (FCS) Accordingly, in case of the first sub-frame (SF1), the white light generated from the lamp 566 is transmitted through the red, green and blue sub-pixels (R, G, B), whereby the red, green and blue light is mixed with the white light transmitted through the white sub-pixel (W). Accordingly, the color image corresponding to the four-color data (RGBW) is displayed on the LCD panel 102.

In the second sub-frame (SF2) of one frame, the video signal corresponding to the four-color data (RGBW) is supplied to the LCD panel 102, and the cyan LED (C) of the LED arrays 568a, 568b, 568c is driven in accordance with the cyan-color light emission signal (VC), whereby the cyan light is applied to the LCD panel 102 by the light-guiding plate 564. In case of the second sub-frame (SF2), the lamp 566 and the yellow LED (Y) are maintained in the off-state by the sub-frame control signal (FCS). Accordingly, in case of the second sub-frame (SF2), the cyan light generated from the cyan LED (C) is transmitted through the white sub-pixel (W), whereby a cyan-color image corresponding to the cyan-color ratio of the three-color data (RGB) is displayed on the LCD panel 102. At this time, the cyan light emitted from the cyan LED (C) is transmitted through only the white sub-pixel (W) having no color filter without being transmitted through the red, green and blue sub-pixels (R, G, B).

In the third sub-frame (SF3) of one frame, the video signal corresponding to the four-color data (RGBW) is supplied to the LCD panel 102, and the yellow LED (Y) of the LED arrays 568a, 568b, 568c is driven in accordance with the yellow-color light emission signal (VY), whereby the yellow light is applied to the LCD panel 102 by the light-guiding plate 564. In case of the third sub-frame (SF3), the lamp 566 and the cyan LED (C) are maintained in the off-state by the sub-frame control signal (FCS). Accordingly, in case of the third sub-frame (SF3), the yellow light generated from the yellow LED (Y) is transmitted through the white sub-pixel (W), whereby a yellow-color image corresponding to the yellow-color ratio of the three-color data (RGB) is displayed on the LCD panel 102. The yellow light emitted from the yellow LED (Y) is transmitted through only the white sub-pixel (W) having no color filter without being transmitted through the red, green and blue sub-pixels (R, G, B).

In the apparatus and method for driving the LCD device according to the third embodiment, the same four-color data (RGBW) is supplied to the LCD panel 102 by each of the first to third sub-frames (SF1 to SF3), however, it is not limited to this. For example, in case of the first sub-frame (SF1), the three-color data (RGB) of the four-color data (RGBW) is supplied to the red, green and blue sub-pixels of the LCD panel 102, and the lamp 566 is driven in synchronization with the three-color data (RGB). In the second sub-frame (SF2), the white data (W) of the four-color data (RGBW) is supplied to the white sub-pixel of the LCD panel 102, and the cyan LED (C) is driven in synchronization with the white data (W).

In the third sub-frame, the white data (W) of the four-color data (RGBW) is supplied to the white sub-pixel of the LCD panel 102, and the yellow LED (Y) is driven in synchronization with the white data (W).

In the apparatus and method for driving the LCD device according to the third embodiment, which uses the backlight array 562 provided with the lamp 566 and the LEDs of two colors (C, Y), the white light, the cyan light generated based on the cyan-color ratio (C) of the input data (RI, GI, BI), and the yellow light generated based on the yellow-color ratio (Y) of the input data (RI, GI, BI) is supplied to the LCD panel 102 by each sub-frame, so that it is possible to improve the color realization ratio by multi-primary.

Figure 16:
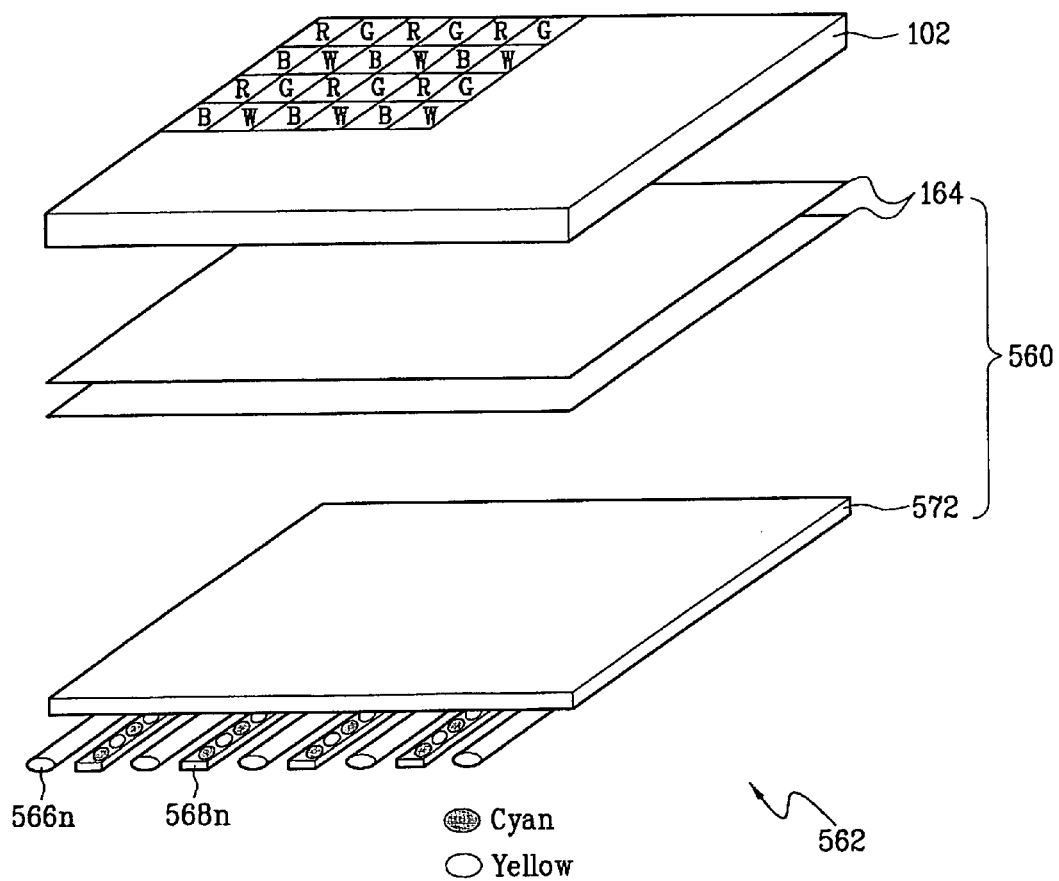
FIG. 16 is a perspective view illustrating a second example of a backlight unit in the LCD device according to the third embodiment.

In one embodiment, as shown in FIG. 16 in association with FIG. 14, the backlight array 562 includes a light-diffusion plate 572. A plurality of lamps 566n which are arranged on the rear surface of the light-diffusion plate 572 at fixed intervals by one direction; a plurality of LED arrays 568n which respectively provided between each of the lamps 566n; and a plurality of optical sheets 164 which are provided above the light-diffusion plate 572.

The plurality of lamps 566n are driven in accordance with a lamp-driving signal (VLamp) supplied from the backlight driver 550, thereby generating the white light. The generated white light is applied to the rear surface of the light-diffusion plate 572.

In one embodiment, each of the plurality of LED arrays 568n is provided with the cyan and yellow LEDs (C, Y) which are repeatedly arranged on a printed circuit board (PCB).

The cyan LED (C) of the plurality of LED arrays 568n is driven in accordance with the cyan-color light emission signal (VC) supplied from the backlight driver 550, thereby generating the cyan light. The yellow LED (Y) of the plurality of LED arrays 568n is driven in accordance with the yellow-color light emission signal (VY) supplied from the backlight driver 550, thereby generating the yellow light.

The plurality of LED arrays 568n generate the cyan or yellow light in accordance with the cyan-color light emission signal (VC) or the yellow-color light emission signal (VY), and apply the generated cyan or yellow light to the light-diffusion plate 572.

In one embodiment, the light-diffusion plate 572 diffuses the white light emitted from the plurality of lamps 566n, and applies the diffused white light to the plurality of optical sheets 164. The light-diffusion plate 572 diffuses the cyan or yellow light emitted from the plurality of LED arrays 568n, and applies the diffused cyan or yellow light to the plurality of optical sheets 164.

In one embodiment, the plurality of optical sheets 164 includes at least one diffusion sheet (or diffusion plate) which diffuses the incident light from the light-diffusion plate 572; and at least one prism sheet which changes the path of light diffused in the diffusion sheet toward the LCD panel 102 to improve the efficiency of light.

Figure 17:
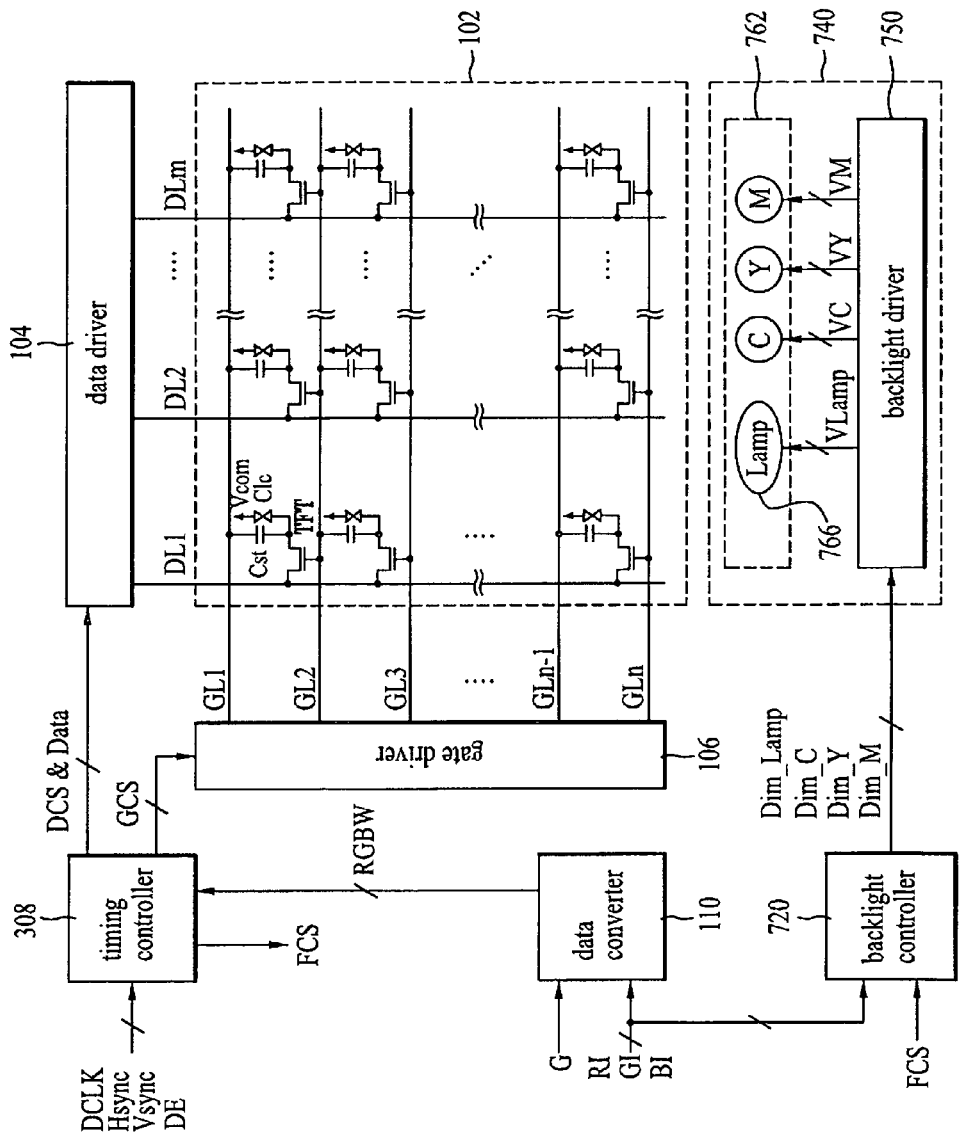
FIG. 17 is a schematic view illustrating an apparatus for driving an LCD device according to a fourth embodiment.

In a fourth embodiment, as shown in FIG. 17, an apparatus for driving the LCD device includes an LCD panel 102 that includes liquid crystal cells formed in respective sub-pixels of four colors defined by n gate lines (GL1 to GLn) and m data lines (DL1 to DLm). A data driver 104 which supplies a video signal to the data lines (DL1 to DLm). A gate driver 106 supplies a scan pulse to the gate lines (GL1 to GLn). A data converter 110 converts input data of three colors (RI, GI, BI) to input data of four colors (RGBW). A timing controller 308 arranges the input data of four colors (RGBW) supplied from the data converter 110 by each frame in four-color data (Data) for four sub-frames and then supplies the arranged data to the data driver 104, and generates a sub-frame control signal (FCS) corresponding to each sub-frame. A backlight unit 740 uses a lamp 766 and LEDs of three colors (C, Y, M) to emit the light to the LCD panel 102. A backlight controller 720 controls the backlight unit 740 in accordance with the input data of three colors (RI, GI, BI) and the sub-frame control signal (FCS). In one embodiment, the data converter 110 and the backlight controller 720 are mounted on the timing controller 308.

Except the backlight controller 720 and the backlight unit 740, the driving apparatus according to the fourth embodiment is identical in structure to that of the second embodiment shown in FIG. 10. Accordingly, the following explanation for the fourth embodiment will be focused on the backlight controller 720 and the backlight unit 740. The other portions of the LCD device according to the fourth embodiment will be substituted by the above explanation of the second embodiment.

In one embodiment, the backlight controller 720 generates a lamp dimming signal (Dim_Lamp) to drive the lamp 766 in accordance with the sub-frame control signal (FCS), and also generates a cyan-color dimming signal (Dim_C), a yellow-color dimming signal (Dim_Y) and a magenta-color dimming signal (Dim_M) to drive the LEDs of three colors (C, Y, M) in accordance with the sub-frame control signal (FCS). The backlight controller 720 supplies the generated dimming signals (Dim_Lamp, Dim_C, Dim_Y, Dim_M)) to the backlight unit 740.

In another embodiment, the backlight controller 720 includes a color-ratio discriminating unit 322 and a dimming signal setting unit 324 as shown in FIG. 12, to thereby generate the cyan-color dimming signal (Dim_C), the yellow-color dimming signal (Dim_Y) and the magenta-color dimming signal (Dim_M) in accordance with the sub-frame control signal (FCS).

The detailed explanation for the color-ratio discriminating unit 322 and the dimming signal setting unit 324 is similar to the description of FIG. 12.

In one embodiment, the backlight unit 740 includes a backlight array 762 that includes the lamp 766, the cyan LED (C), the yellow LED (Y) and the magenta LED (M); and a backlight driver 750 which drives the backlight array 762.

The backlight driver 750 generates a lamp-driving signal (VLamp) in accordance with the lamp dimming signal (Dim_Lamp) supplied from the backlight controller 720, to thereby drive the lamp 766. The backlight driver 750 generates a cyan-color light emission signal (VC) in accordance with the cyan-color dimming signal (Dim_C) supplied from the backlight controller 720, to thereby drive the cyan LED (C). The backlight driver 750 generates a yellow-color light emission signal (VY) in accordance with the yellow-color dimming signal (Dim_Y) supplied from the backlight controller 720, to thereby drive the yellow LED (Y). The backlight driver 750 generates a magenta-color light emission signal (VM) in accordance with the magenta-color dimming signal (Dim_M) supplied from the backlight controller 720, to thereby drive the magenta LED (M).

Figure 18:
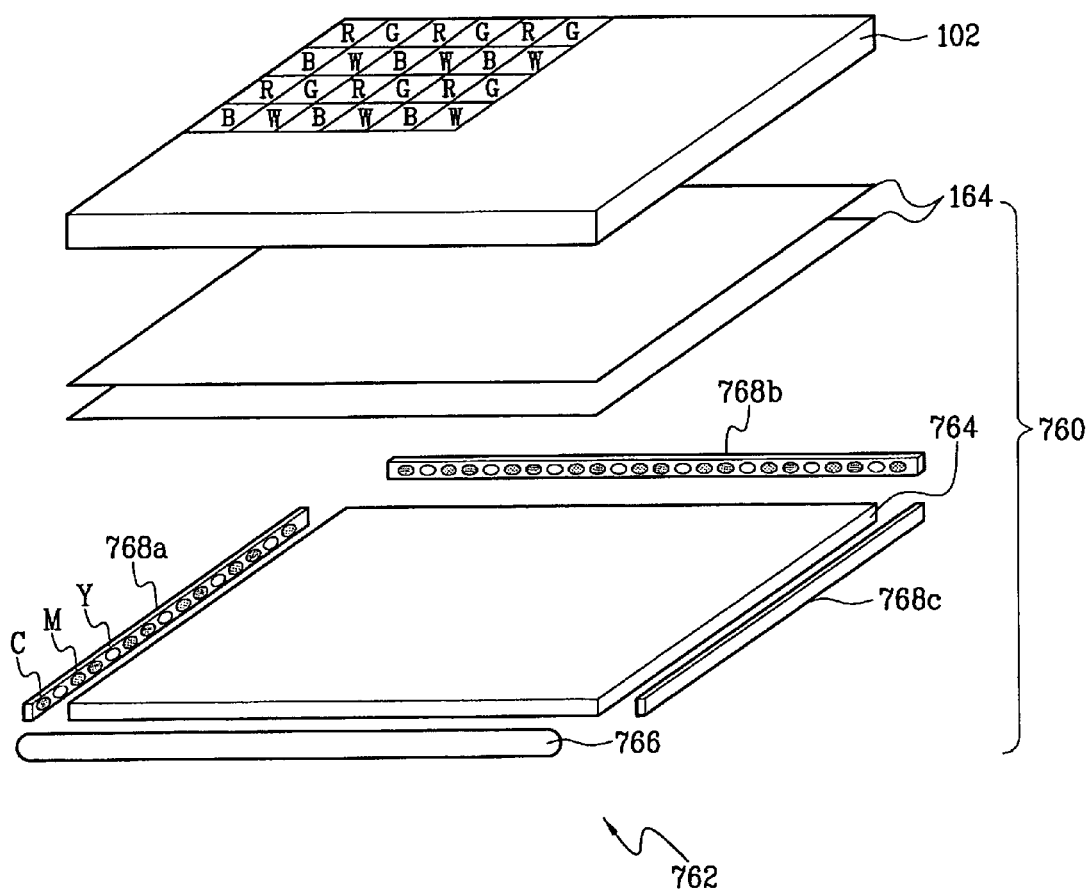
FIG. 18 is a perspective view illustrating a first example of a backlight array in the LCD device according to the fourth embodiment shown in FIG. 17.

In one embodiment, as shown in FIG. 18 in association with FIG. 17, the backlight array 762 includes a light-guiding plate 764 which is provided with incidence sides formed at the lateral side thereof to guide the incident light toward the LCD panel 102. A lamp 766 faces the first side of the light-guiding plate 764. First to third LED arrays 768a, 768b, 768c face the second to fourth sides of the light-guiding plate 764. A plurality of optical sheets 164 are arranged above the light-guiding plate 764.

The lamp 766 faces the first side of the light-guiding plate 764, wherein the lamp 766 is turned-on in accordance with the lamp-driving signal (VLamp) supplied from the backlight driver 750, thereby generating the white light. As driving the lamp 766, the generated white light is applied to the first incidence side corresponding to the first lateral side of the light-guiding plate 764.

In one embodiment, each of the first to third LED arrays 768a, 768b, 768c is provided with the cyan, yellow and magenta LEDs (C, Y, M) repeatedly arranged on a printed circuit board (PCB). The cyan LED (C) of the first to third LED arrays 768a, 768b, 768c is driven in accordance with the cyan-color light emission signal (VC) supplied from the backlight driver 750, thereby generating the cyan light. The yellow LED (Y) of the first to third LED arrays 768a, 768b, 768c is driven in accordance with the yellow-color light emission signal (VY) supplied from the backlight driver 750, thereby generating the yellow light. The magenta LED (M) of the first to third LED arrays 768a, 768b, 768c is driven in accordance with the magenta-color light emission signal (VY) supplied from the backlight driver 750, thereby generating the magenta light.

In one embodiment, the first to third LED arrays 768a, 768b, 768c generate the cyan, yellow and magenta light in accordance with the cyan-color light emission signal (VC), the yellow-color light emission signal (VY) and the magenta-color light emission signal (VM), and supply the generated cyan, yellow and magenta light to the second to fourth incidence sides corresponding to the second to fourth lateral sides of the light-guiding plate 764.

The incidence sides of the light-guiding plate 764 change the path of light corresponding to white, cyan, yellow and magenta light toward the LCD panel 102.

In another embodiment, the plurality of optical sheets 164 include at least one diffusion sheet (or diffusion plate) which diffuses the incident light from the light-guiding plate 764; and at least one prism sheet which changes the path of light diffused in the diffusion sheet toward the LCD panel 102 to improve the efficiency of light.

In one embodiment, depending on the size or model of the LCD panel 102, the lamp 766 of the backlight array 762 may be provided in at least one side of the light-guiding plate 764, and the LED arrays 768a, 768b, 768c may be provided in the remaining sides having no lamp 766. For example, if the LCD panel 102 has a size of 12-inch or less, at least one lamp 766 is provided in one side of the four sides of the light-guiding plate 764, and the LED arrays are provided in the three sides of the light-guiding plate 764. If the LCD panel 102 has a size of 12-inch or more, at least one lamp 766 is provided in the two sides of the light-guiding plate 764, and the LED arrays are provided in the two sides of the light-guiding plate 764.

In one embodiment, a method for driving the LCD device using the driving apparatus according to the fourth embodiment will be explained with reference to FIG. 13. The three-color input data (RGB) externally inputted by each frame is converted into the four-color data (RGBW). The converted four-color data (RGBW) is arranged in each of the first to fourth sub-frames (SF1 to SF4). The sub-frame control signal (FCS) is generated in correspondence with each of the first to fourth sub-frames (SF1 to SF4). Using equation 3, the cyan-color dimming signal (Dim_C) is generated in accordance with the cyan-color ratio of the three-color input data (RGB). Using equation 4, the yellow-color dimming signal (Dim_Y) is generated in accordance with the yellow-color ratio of the three-color input data (RGB). Using equation 5, the magenta-color dimming signal (Dim_M) is generated in accordance with the magenta-color ratio of the three-color input data (RGB).

The converted four-color data (RGBW) is supplied to the LCD panel 102 by the first to fourth sub-frames (SF1 to SF4). The white light, the cyan light, the yellow light and the magenta light is sequentially supplied to the LCD panel 102 by controlling the backlight unit 740 in accordance with the sub-frame control signal (FCS) corresponding to the first to fourth sub-frames (SF1 to SF4).

In the first sub-frame (SF1) of one frame, the video signal corresponding to the four-color data (RGBW) is supplied to the LCD panel 102, and the lamp 766 is driven in accordance with the lamp-driving signal (VLamp), whereby the white light is applied to the LCD panel 102 by the light-guiding plate 764. The cyan, yellow and magenta LEDs (C, Y, M) are maintained in the off-state by the sub-frame control signal (FCS). Accordingly, in case of the first sub-frame (SF1), the white light generated from the lamp 766 is transmitted through the red, green and blue sub-pixels (R, G, B), whereby the red, green and blue light is mixed with the white light transmitted through the white sub-pixel (W). The color image corresponding to the four-color data (RGBW) is displayed on the LCD panel 102.

In the second sub-frame (SF2) of one frame, the video signal corresponding to the four-color data (RGBW) is supplied to the LCD panel 102, and the cyan LED (C) of the LED arrays 768a, 768b, 768c is driven in accordance with the cyan-color light emission signal (VC), whereby the cyan light is applied to the LCD panel 102 by the light-guiding plate 764. In case of the second sub-frame (SF2), the lamp 566, the yellow LED (Y) and the magenta LED (M) are maintained in the off-state by the sub-frame control signal (FCS). Accordingly, in case of the second sub-frame (SF2), the cyan light generated from the cyan LED (C) is transmitted through the white sub-pixel (W), whereby a cyan-color image corresponding to the cyan-color ratio of the three-color data (RGB) is displayed on the LCD panel 102. The cyan light emitted from the cyan LED (C) is transmitted through only the white sub-pixel (W) having no color filter without being transmitted through the red, green and blue sub-pixels (R, G, B).

In the third sub-frame (SF3) of one frame, the video signal corresponding to the four-color data (RGBW) is supplied to the LCD panel 102, and the yellow LED (Y) of the LED arrays 768a, 768b, 768c is driven in accordance with the yellow-color light emission signal (VY), whereby the yellow light is applied to the LCD panel 102 by the light-guiding plate 764. In case of the third sub-frame (SF3), the lamp 766, the cyan LED (C) and the magenta LED (M) are maintained in the off-state by the sub-frame control signal (FCS). Accordingly, in case of the third sub-frame (SF3), the yellow light generated from the yellow LED (Y) is transmitted through the white sub-pixel (W), whereby a yellow-color image corresponding to the yellow-color ratio of the three-color data (RGB) is displayed on the LCD panel 102. The yellow light emitted from the yellow LED (Y) is transmitted through only the white sub-pixel (W) having no color filter without being transmitted through the red, green and blue sub-pixels (R, G, B).

In the fourth sub-frame (SF4) of one frame, the video signal corresponding to the four-color data (RGBW) is supplied to the LCD panel 102, and the magenta LED (M) of the LED arrays 768a, 768b, 768c is driven in accordance with the magenta-color light emission signal (VM), whereby the magenta light is applied to the LCD panel 102 by the light-guiding plate 764. In case of the fourth sub-frame (SF4), the lamp 766, the cyan LED (C) and the yellow LED (Y) are maintained in the off-state by the sub-frame control signal (FCS). Accordingly, in case of the fourth sub-frame (SF4), the magenta light generated from the magenta LED (M) is transmitted through the white sub-pixel (W), whereby a magenta-color image corresponding to the magenta-color ratio of the three-color data (RGB) is displayed on the LCD panel 102. The magenta light emitted from the magenta LED (M) is transmitted through only the white sub-pixel (W) having no color filter without being transmitted through the red, green and blue sub-pixels (R, G, B).

In the apparatus and method for driving the LCD device according to the fourth embodiment, the same four-color data (RGBW) is supplied to the LCD panel 102 by each of the first to fourth sub-frames (SF1 to SF4), however, it is not limited to this. For example, in case of the first sub-frame (SF1), the three-color data (RGB) of the four-color data (RGBW) is supplied to the red, green and blue sub-pixels of the LCD panel 102, and the lamp 766 is driven in synchronization with the three-color data (RGB). In the second sub-frame (SF2), the white data (W) of the four-color data (RGBW) is supplied to the white sub-pixel of the LCD panel 102, and the cyan LED (C) is driven in synchronization with the white data (W). In the third sub-frame, the white data (W) of the four-color data (RGBW) is supplied to the white sub-pixel of the LCD panel 102, and the yellow LED (Y) is driven in synchronization with the white data (W). In the fourth sub-frame, the white data (W) of the four-color data (RGBW) is supplied to the white sub-pixel of the LCD panel 102, and the magenta LED (M) is driven in synchronization with the white data (W).

In the apparatus and method for driving the LCD device according to the fourth embodiment, which uses the backlight array 762 provided with the lamp 766 and the LEDs of three colors (C, Y, M), the white light, the cyan light generated based on the cyan-color ratio (C) of the input data (RI, GI, BI), the yellow light generated based on the yellow-color ratio (Y) of the input data (RI, GI, BI), and the magenta light generated based on the magenta-color ratio (M) of the input data (RI, GI, BI) is supplied to the LCD panel 102 by each sub-frame, so that it is possible to improve the color realization ratio by multi-primary.

Figure 19:
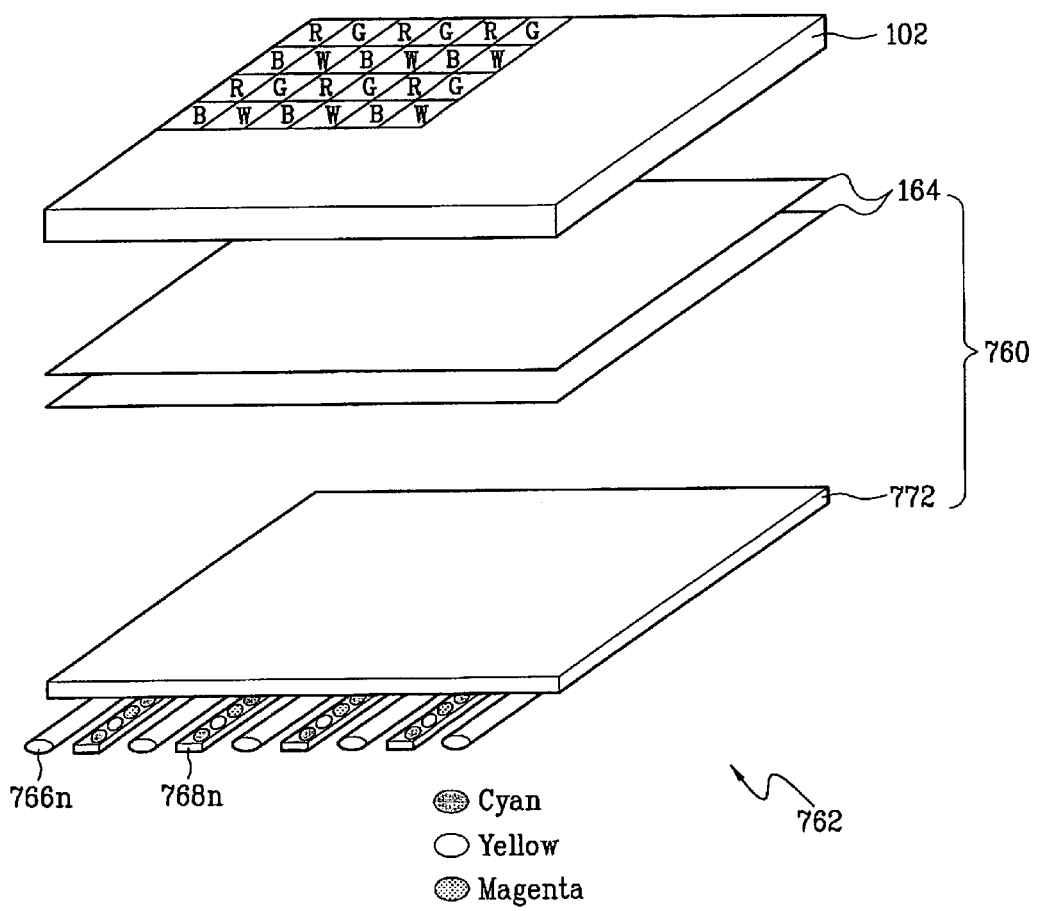
FIG. 19 is a perspective view illustrating a second example of a backlight array in the LCD device according to the fourth embodiment shown in FIG. 17.

In one embodiment, as shown in FIG. 19 in association with FIG. 17, the backlight array 762 includes a light-diffusion plate 772. A plurality of lamps 766n are arranged on the rear surface of the light-diffusion plate 772 at fixed intervals by one direction. A plurality of LED arrays 768n are respectively provided between each of the lamps 766n. A plurality of optical sheets 164 are provided above the light-diffusion plate 772.

In one embodiment, the plurality of lamps 766n are driven in accordance with a lamp-driving signal (VLamp) supplied from the backlight driver 750, thereby generating the white light. The generated white light is applied to the rear surface of the light-diffusion plate 772.

In one embodiment, each of the plurality of LED arrays 768n is provided with the cyan, yellow and magenta LEDs (C, Y, M) which are repeatedly arranged on a printed circuit board (PCB).

The cyan LED (C) of the plurality of LED arrays 768n is driven in accordance with the cyan-color light emission signal (VC) supplied from the backlight driver 750, thereby generating the cyan light. The yellow LED (Y) of the plurality of LED arrays 768n is driven in accordance with the yellow-color light emission signal (VY) supplied from the backlight driver 550, thereby generating the yellow light. The magenta LED (M) of the plurality of LED arrays 768n is driven in accordance with the magenta-color light emission signal (VM) supplied from the backlight driver 550, thereby generating the magenta light.

The plurality of LED arrays 768n generate the cyan, yellow or magenta light in accordance with the cyan-color light emission signal (VC), the yellow-color light emission signal (VY) or the magenta-color light emission signal (VM), and apply the generated cyan, yellow or magenta light to the light-diffusion plate 772.

The light-diffusion plate 772 diffuses the white light emitted from the plurality of lamps 766n, and applies the diffused white light to the plurality of optical sheets 164. The light-diffusion plate 772 diffuses the cyan, yellow or magenta light emitted from the plurality of LED arrays 768n, and applies the diffused cyan, yellow or magenta light to the plurality of optical sheets 164.

In one embodiment, the plurality of optical sheets 164 includes at least one diffusion sheet (or diffusion plate) which diffuses the incident light from the light-diffusion plate 772; and at least one prism sheet which changes the path of light diffused in the diffusion sheet toward the LCD panel 102 to improve the efficiency of light.

In one embodiment, the white light is generated from the red, green and blue LEDs, and at least two of cyan, yellow and magenta light generated from the cyan, yellow and magenta LEDs; and is applied to the LCD panel by each sub frame for one frame. In this embodiment, it is possible to improve the color realization ratio by multi-primary.

In one embodiment, the white light generated from the lamp, and at least two of cyan, yellow and magenta light generated from the cyan, yellow and magenta LEDs is applied to the LCD panel by each sub frame for one frame. In this embodiment, it is possible to improve the color realization ratio by multi-primary.

It will be apparent to those skilled in the art that various modifications and variations can be made in the present embodiments without departing from the described embodiments. Thus, it is intended that the present invention cover modifications, combinations and variations of embodiments.

What is claimed is:

1. An apparatus that drives an LCD device comprising:
   an LCD panel that includes red, green, blue and white sub-pixels;
   a data converter that converts input data of three colors into input data of four colors;
   a data driver that is operative to convert the input data of four colors into a video signal, and supply the video signal to each sub-pixel;
   a gate driver that supplies a scan pulse to each sub-pixel;
   a timing controller that is operative to arrange the input data of four colors for at least three sub-frames, supply the arranged data to the data driver, and generate a sub-frame control signal corresponding to each sub-frame;
   a backlight unit that includes LEDs of at least five colors; and
   a backlight controller that controls the backlight unit in accordance with the input data of three colors and the sub-frame control signal,
   wherein the backlight unit includes:
   a plurality of LED arrays, each LED array provided with at least two of cyan, yellow and magenta LEDs, and three-color LEDs of red, green and blue colors; and
   an LED array driver that generates red, green and blue light emission signals to drive the three-color LEDs of red, green and blue colors in accordance with the three-color dimming signals, and generates at least two of cyan, yellow and magenta light emission signals to drive the at least two-color LEDs of cyan, yellow and magenta colors in accordance with the at least two-color dimming signals, so that a first sub-frame of one frame displays the three-color image by transmitting the white light generated from the three-color LEDs through the red, green, blue and white sub-pixels, a second sub-frame of one frame displays the first-color image by transmitting the first-color light generated from the first-color LED in the LEDs of two colors through the white sub-pixel, and a third sub-frame of one frame displays the second-color image by transmitting the second-color light generated from the second-color LED in the LEDs of two colors through the white sub-pixel.

2. The apparatus of claim 1, wherein the data converter includes:
   a data amplifying unit that generates amplified data of three colors by multiplying the input data of three colors and a gain value;
   a white-data extracting unit that extracts white data from the amplified data of three colors; and
   a subtracting unit that subtracts the white data from the amplified data of three colors supplied from the data amplifying unit,
   wherein the input data of four colors corresponds to the first to third input data and the white data.

3. The apparatus of claim 1, wherein the timing controller includes:
   a data arranging unit that arranges the four-color data for one frame supplied from the data converter in four-color data for three sub-frames, and supplies the arranged four-color data to the data driver;
   a synchronization signal controlling unit that converts a first synchronization signal into a second synchronization signal corresponding to the at least three sub-frames; and
   a control signal generating unit that generates a data control signal that controls the data driver, a gate control signal that controls the gate driver, and the sub-frame control signal by the at least three sub-frames by using the second synchronization signal.

4. The apparatus of claim 1, wherein the backlight controller includes:
   a color-ratio discriminating unit which generates at least two of a cyan-color ratio signal, a yellow-color ratio signal and a magenta-color ratio signal in accordance with at least two of a cyan-color ratio, a yellow-color ratio and a magenta-color ratio from the input data of three colors; and
   a dimming signal setting unit that generates at least two dimming signals corresponding to the at least two ratio signals in accordance with the sub-frame control signal, and generates the set three-color dimming signals.

5. The apparatus of claim 4, wherein the cyan-color ratio signal is generated by the ratio of green/red to blue/red, the yellow-color ratio signal is generated by the ratio of green/blue to red/blue, and the magenta-color ratio signal is generated by the ratio of red/green to blue/green.

6. An apparatus that drives an LCD device comprising:
   an LCD panel that includes red, green, blue and white sub-pixels;
   a data converter that converts input data of three colors into input data of four colors;
   a data driver that is operative to convert the input data of four colors into a video signal, and supply the video signal to each sub-pixel;
   a gate driver that supplies a scan pulse to each sub-pixel;
   a timing controller that is operative to arrange the input data of four colors for at least three sub-frames, supply the arranged data to the data driver, and generate a sub-frame control signal corresponding to each sub-frame;

a backlight unit that includes LEDs of at least five colors; and
a backlight controller that controls the backlight unit in accordance with the input data of three colors and the sub-frame control signal,
wherein the backlight unit includes:
a plurality of LED arrays, each LED array provided with at least two of cyan, yellow and magenta LEDs, and three-color LEDs of red, green and blue colors; and
an LED array driver that generates red, green and blue light emission signals to drive the three-color LEDs of red, green and blue colors in accordance with the three-color dimming signals, and generates at least two of cyan, yellow and magenta light emission signals to drive the at least two-color LEDs of cyan, yellow and magenta colors in accordance with the at least two-color dimming signals, so that
a first sub-frame of one frame displays the three-color image by transmitting the white light generated from the three-color LEDs through the red, green, blue and white sub-pixels, a second sub-frame of one frame displays the first-color image by transmitting the first-color light generated from the first-color LED corresponding to any one of the at least two of the cyan, yellow and magenta LEDs through the white sub-pixel, a third sub-frame of one frame displays the second-color image by transmitting the second-color light generated from the second-color LED corresponding to another of the cyan, yellow and magenta LEDs through the white sub-pixel, and a fourth sub-frame of one frame displays the third-color image by transmitting the third-color light generated from the third-color LED corresponding to the third of the cyan, yellow and magenta LEDs through the white sub-pixel.

7. An apparatus for driving an LCD device comprising:
an LCD panel that includes red, green, blue and white sub-pixels;
a data converter that is operative to convert input data of three colors into input data of four colors;
a data driver that is operative to convert the input data of four colors into a video signal, and supply the video signal to each sub-pixel;
a gate driver that supplies a scan pulse to each sub-pixel;
a timing controller that is operative to arrange the input data of four colors for at least three sub-frames, supply the arranged data to the data driver, and generate a sub-frame control signal corresponding to each sub-frame;
a backlight unit that includes at least one lamp and at least two LEDs; and
a backlight controller that controls the backlight unit in accordance with the input data of three colors and the sub-frame control signal,
wherein the backlight unit includes:
a backlight array that includes at least one lamp and the at least two of cyan, yellow and magenta LEDs; and
a backlight driver that generates a lamp driving signal that drives the lamp in accordance with the lamp dimming signal, and generates at least two light emission signals that drive the at least two LEDs, so that a first sub-frame of one frame displays the three-color image and transmits the white light generated from the lamp through the red, green, blue and white sub-pixels, a second sub-frame of one frame displays the first-color image and transmits the first-color light generated from the first-color LED in the LEDs of two colors through the white sub-pixel, and a third sub-frame of one frame displays the second-color image and transmits the second-color light generated from the second-color LED in the LEDs of two colors through the white sub-pixel.

8. The apparatus of claim 7, wherein the data converter includes:
a data amplifying unit that generates amplified data of three colors by multiplying the input data of three colors and a gain value;
a white-data extracting unit that extracts white data from the amplified data of three colors; and
a subtracting unit that subtracts the white data from the amplified data of three colors supplied from the data amplifying unit,
wherein the input data of four colors corresponds to the first to third input data and the white data.

9. The apparatus of claim 7, wherein the timing controller includes:
a data arranging unit that is operative to arrange the four-color data for one frame supplied from the data converter in four-color data for three sub-frames, and supply the arranged four-color data to the data driver;
a synchronization signal controlling unit that converts a first synchronization signal into a second synchronization signal corresponding to the at least three sub-frames; and
a control signal generating unit that generates a data control signal that controls the data driver, a gate control signal that controls the gate driver, and the sub-frame control signal that controls at least three sub-frames by using the second synchronization signal.

10. The apparatus of claim 7, wherein the backlight controller includes:
a color-ratio discriminating unit that generates at least two of a cyan-color ratio signal, a yellow-color ratio signal and a magenta-color ratio signal in accordance with at least two of a cyan-color ratio, a yellow-color ratio and a magenta-color ratio from the input data of three colors; and
a dimming signal setting unit that generates a lamp dimming signal that drives the at least one lamp in accordance with the sub-frame control signal, and generates at least two dimming signals corresponding to the at least two ratio signals.

11. The apparatus of claim 10, wherein the cyan-color ratio signal is generated by the ratio of green/red to blue/red, the yellow-color ratio signal is generated by the ratio of green/blue to red/blue, and the magenta-color ratio signal is generated by the ratio of red/green to blue/green.

12. The apparatus of claim 7, wherein the backlight array includes:
a light-guiding plate having lateral sides, which correspond to incidence sides to guide the incident light, toward the LCD panel;
the lamp faces at least one side of the light-guiding plate;
at least one LED array faces the other sides of the light-guiding plate having no lamp, each LED array provided with LEDs of at least two colors; and
a plurality of optical sheets which are arranged above the light-guiding plate.

13. The apparatus of claim 7, wherein the backlight array includes:
a light-diffusion plate that diffuses the incident light,
wherein the plurality of lamps are arranged on the rear surface of the light-diffusion plate at fixed intervals in one direction;
a plurality of LED arrays that are provided between each of the lamps, wherein each LED array is provided with LEDs of at least two colors; and a plurality of optical sheets are provided above the light-diffusion plate.

14. An apparatus for driving an LCD device comprising:
an LCD panel that includes red, green, blue and white sub-pixels;
a data converter that is operative to convert input data of three colors into input data of four colors;
a data driver that is operative to convert the input data of four colors into a video signal, and supply the video signal to each sub-pixel;
a gate driver that supplies a scan pulse to each sub-pixel;
a timing controller that is operative to arrange the input data of four colors for at least three sub-frames, supply the arranged data to the data driver, and generate a sub-frame control signal corresponding to each sub-frame;
a backlight unit that includes at least one lamp and at least two LEDs; and
a backlight controller that controls the backlight unit in accordance with the input data of three colors and the sub-frame control signal,
wherein the backlight unit includes:
a backlight array that includes at least one lamp and the at least two of cyan, yellow and magenta LEDs; and
a backlight driver that generates a lamp driving signal that drives the lamp in accordance with the lamp dimming signal, and generates at least two light emission signals that drive the at least two LEDs, so that a first sub-frame of one frame displays the three-color image and transmits the white light generated from the lamp through the red, green, blue and white sub-pixels, a second sub-frame of one frame displays the first-color image and transmits the first-color light generated from the first-color LED corresponding to any one of the cyan, yellow and magenta LEDs through the white sub-pixel, a third sub-frame of one frame displays the second-color image and transmits the second-color light generated from the second-color LED corresponding to another of the cyan, yellow and magenta LEDs through the white sub-pixel, and a fourth sub-frame of one frame displays the third-color image and transmits the third-color light generated from the third-color LED, which corresponds to the third of the cyan, yellow and magenta LEDs through the white sub-pixel.

15. A method that drives an LCD device including an LCD panel provided with red, green, blue and white sub-pixels comprising:
converting input data of three colors into input data of four colors;
arranging the four-color data of each frame in four-color input data for at least three sub-frames, and supplying the arranged four-color data to the data driver, and generating a sub-frame control signal corresponding to each sub-frame;
supplying a scan pulse to each sub-pixel;
converting the four-color input data into a video signal, and supplying the video signal to each sub-pixel in synchronization with the four-color input data; and
driving a backlight unit that has LEDs of at least five colors in accordance with the three-color input data and the sub-frame control signal, to thereby emit the light to the LCD panel,
wherein the step of driving a backlight unit that has LEDs of at least five colors includes:
generating at least two of a cyan-color ratio signal, a yellow-color ratio signal and a magenta-color ratio signal in accordance with at least two of a cyan-color ratio, a yellow-color ratio and a magenta-color ratio from the input data of three colors;
generating at least two dimming signals that correspond to the at least two ratio signals in accordance with the sub-frame control signal, and generating the set three-color dimming signals; and
generating red, green and blue light emission signals to drive the red, green and blue LEDs in accordance with the three-color dimming signals, and at least two of cyan, yellow and magenta light emission signals to drive the at least two of the cyan, yellow and magenta LEDs in accordance with the at least two dimming signals, so that a first sub-frame displays the three-color image and transmits the white light generated from the three-color LEDs through the red, green, blue and white sub-pixels, a second sub-frame displays the first-color image and transmits the first-color light generated from the first-color LED in the LEDs of two colors through the white sub-pixel, and a third sub-frame displays the second-color image and transmits the second-color light generated from the second-color LED in the LEDs of two colors through the white sub-pixel.

16. The method of claim 15, wherein converting input data of three colors into input data of four colors includes:
generating amplified data of three colors by multiplying the input data of three colors inputted externally and a gain value inputted externally;
extracting white data out of the amplified data of three colors; and
generating first to third color input data by subtracting the white data from the amplified data of three colors, wherein the input data of four colors correspond to the first to third color input data and the white data.

17. The method of claim 15, wherein arranging the four-color data of each frame in four-color input data for at least three sub-frames includes:
converting a first synchronization signal externally inputted into a second synchronization signal that corresponds to the at least three sub-frames; and
generating a gate control signal to supply a scan pulse to each sub-pixel, and a data control signal to supply a video signal to each sub-pixel by using the second synchronization signal.

18. The method of claim 15, wherein the cyan-color ratio signal is generated by the ratio of green/red to blue/red, the yellow-color ratio signal is generated by the ratio of green/blue to red/blue, and the magenta-color ratio signal is generated by the ratio of red/green to blue/green.

19. A method that drives an LCD device including an LCD panel provided with red, green, blue and white sub-pixels comprising:
converting input data of three colors into input data of four colors;
arranging the four-color data of each frame in four-color input data for at least three sub-frames, and supplying the arranged four-color data to the data driver, and generating a sub-frame control signal corresponding to each sub-frame;
supplying a scan pulse to each sub-pixel;
converting the four-color input data into a video signal, and supplying the video signal to each sub-pixel in synchronization with the four-color input data; and
driving a backlight unit that has LEDs of at least five colors in accordance with the three-color input data and the sub-frame control signal, to thereby emit the light to the LCD panel, wherein the step of driving a backlight unit that has LEDs of at least five colors includes:

generating at least two of a cyan-color ratio signal, a yellow-color ratio signal and a magenta-color ratio signal in accordance with at least two of a cyan-color ratio, a yellow-color ratio and a magenta-color ratio from the input data of three colors;

generating at least two dimming signals that correspond to the at least two ratio signals in accordance with the sub-frame control signal, and generating the set three-color dimming signals; and generating red, green and blue light emission signals to drive the red, green and blue LEDs in accordance with the three-color dimming signals, and at least two of cyan, yellow and magenta light emission signals to drive the at least two of the cyan, yellow and magenta LEDs in accordance with the at least two dimming signals, so that a first sub-frame displays the three-color image and transmits the white light generated from the three-color LEDs through the red, green, blue and white sub-pixels, a the second sub-frame displays the first-color image and transmits the first-color light generated from the first-color LED corresponding to any one of the cyan, yellow and magenta LEDs through the white sub-pixel, a the third sub-frame displays the second-color image and transmits the second-color light generated from the second-color LED corresponding to another of the cyan, yellow and magenta LEDs through the white sub-pixel, and a the fourth sub-frame displays the third-color image and transmits the third-color light generated from the third-color LED corresponding to the third of the cyan, yellow and magenta LEDs through the white sub-pixel.

20. A method for driving an LCD device including an LCD panel provided with red, green, blue and white sub-pixels comprising:

converting input data of three colors into input data of four colors;

arranging the four-color data of each frame in four-color input data for at least three sub-frames, and supplying the arranged four-color data to the data driver, and generating a sub-frame control signal corresponding to each sub-frame;

supplying a scan pulse to each sub-pixel;

converting the four-color input data into a video signal, and supplying the video signal to each sub-pixel in synchronization with the four-color input data; and driving backlight unit having at least one lamp and at least two LEDs in accordance with the three-color input data and the sub-frame control signal, to thereby emit the light to the LCD panel, wherein the step of driving the backlight unit having at least one lamp and at least two LEDs includes:

generating at least two of a cyan-color ratio signal, a yellow-color ratio signal and a magenta-color ratio signal in accordance with at least two of a cyan-color ratio, a yellow-color ratio and a magenta-color ratio from the input data of three colors;

generating a lamp dimming signal to drive the at least one lamp, and at least two dimming signals that correspond to the at least two ratio signals in accordance with the sub-frame control signal; and generating a lamp driving signal to drive the lamp in accordance with the lamp dimming signal, and at least two light emission signals to drive the at least two of cyan, yellow and magenta LEDs in accordance with the at least two dimming signals, so that a first sub-frame displays the three-color image and transmits the white light generated from the lamp through the red, green, blue and white sub-pixels, a second sub-frame displays the first-color image and transmits the first-color light generated from the first-color LED in the LEDs of two colors through the white sub-pixel, and a third sub-frame displays the second-color image and transmits the second-color light generated from the second-color LED in the LEDs of two colors through the white sub-pixel.

21. The method of claim 20, wherein converting input data of three colors into input data of four colors includes:

generating amplified data of three colors by multiplying the input data of three colors inputted externally and a gain value inputted externally;

extracting white data out of the amplified data of three colors; and generating first to third color input data by subtracting the white data from the amplified data of three colors, wherein the input data of four colors correspond to the first to third color input data and the white data.

22. The method of claim 20, wherein arranging the four-color data of each frame in four-color input data for at least three sub-frames includes:

converting a first synchronization signal externally inputted into a second synchronization signal that corresponds to the at least three sub-frames; and generating a gate control signal to supply a scan pulse to each sub-pixel, and a data control signal to supply a video signal to each sub-pixel by using the second synchronization signal.

23. The method of claim 20, wherein the cyan-color ratio signal is generated by the ratio of green/red to blue/red, the yellow-color ratio signal is generated by the ratio of green/blue to red/blue, and the magenta-color ratio signal is generated by the ratio of red/green to blue/green.

24. A method for driving an LCD device including an LCD panel provided with red, green, blue and white sub-pixels comprising:

converting input data of three colors into input data of four colors;

arranging the four-color data of each frame in four-color input data for at least three sub-frames, and supplying the arranged four-color data to the data driver, and generating a sub-frame control signal corresponding to each sub-frame;

supplying a scan pulse to each sub-pixel;

converting the four-color input data into a video signal, and supplying the video signal to each sub-pixel in synchronization with the four-color input data; and driving backlight unit having at least one lamp and at least two LEDs in accordance with the three-color input data and the sub-frame control signal, to thereby emit the light to the LCD panel, wherein the step of driving the backlight unit having at least one lamp and at least two LEDs includes:

generating at least two of a cyan-color ratio signal, a yellow-color ratio signal and a magenta-color ratio signal in accordance with at least two of a cyan-color ratio, a yellow-color ratio and a magenta-color ratio from the input data of three colors;

generating a lamp dimming signal to drive the at least one lamp, and at least two dimming signals that correspond to the at least two ratio signals in accordance with the sub-frame control signal; and generating a lamp driving signal to drive the lamp in accordance with the lamp dimming signal, and at least two light emission signals to drive the at least two of cyan, yellow and magenta LEDs in accordance with the at least two dimming signals, so that a first sub-frame displays the three-color image and transmits the white light generated from the lamp through the red, green, blue and white sub-pixels, a second sub-frame displays the first-color image and transmits the first-color light generated from the first-color LED corresponding to any one of the cyan, yellow and magenta LEDs through the white sub-pixel, a third sub-frame displays the second-color image and transmits the second-color light generated from the second-color LED corresponding to another of the cyan, yellow and magenta LEDs through the white sub-pixel, and a fourth sub-frame displays the third-color image and transmits the third-color light generated from the third-color LED corresponding to the third of the cyan, yellow and magenta LEDs through the white sub-pixel.

* * * * *